US 10,142,944 B2

United States Patent
Lopes et al.

(10) Patent No.: US 10,142,944 B2
(45) Date of Patent: Nov. 27, 2018

(54) VERIFICATION OF AUTHORIZED SHARED ACCESS OPERATION

(71) Applicant: QUALCOMM Incorporated, San Diego, CA (US)

(72) Inventors: Luis Fernando Brisson Lopes, Swindon (GB); Etienne Francois Chaponniere, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/481,376

(22) Filed: Apr. 6, 2017

(65) Prior Publication Data

US 2017/0223638 A1    Aug. 3, 2017

Related U.S. Application Data

(63) Continuation of application No. 14/448,806, filed on Jul. 31, 2014, now Pat. No. 9,635,560.

(Continued)

(51) Int. Cl.
| | |
|---|---|
| *H04W 16/10* | (2009.01) |
| *H04W 52/24* | (2009.01) |
| *H04W 16/14* | (2009.01) |
| *H04W 24/02* | (2009.01) |
| *H04W 72/08* | (2009.01) |

(Continued)

(52) U.S. Cl.
CPC ......... *H04W 52/243* (2013.01); *H04L 5/0041* (2013.01); *H04L 5/0062* (2013.01); *H04W 16/10* (2013.01); *H04W 16/14* (2013.01); *H04W 24/02* (2013.01); *H04W 24/10* (2013.01); *H04W 72/00* (2013.01); *H04W 72/082* (2013.01); *H04L 5/0007* (2013.01)

(58) Field of Classification Search
CPC ............................ H04W 16/10; H04W 72/082
USPC .... 455/515, 452.1, 452.2, 67.11, 67.13, 509, 455/501
See application file for complete search history.

(56) References Cited

U.S. PATENT DOCUMENTS

| | | |
|---|---|---|
| 8,140,018 B2 | 3/2012 | Abedi |
| 8,532,041 B1 | 9/2013 | Lambert et al. |

(Continued)

FOREIGN PATENT DOCUMENTS

| | | |
|---|---|---|
| JP | 2012147216 A | 8/2012 |
| JP | 2013511240 A | 3/2018 |

OTHER PUBLICATIONS

International Search Report and Written Opinion—PCT/US2014/049430—ISA/EPO—dated Oct. 16, 2014.

(Continued)

*Primary Examiner* — John J Lee
(74) *Attorney, Agent, or Firm* — Anthony R. Morris

(57) ABSTRACT

A method of wireless communication is presented. The method includes receiving, at a user equipment (UE) operating on an authorized shared access (ASA) spectrum, an inter-frequency measurement report from a wireless device operating in a specific area and operating on a spectrum that is different from the ASA spectrum. The method also includes receiving, at the UE from a network controller, a transmission adjustment request based at least in part on the measurement report. The method further includes adjusting, at the UE, a transmission based on the transmission adjustment request and/or the measurement report.

20 Claims, 18 Drawing Sheets

Related U.S. Application Data

(60) Provisional application No. 61/862,364, filed on Aug. 5, 2013.

(51) Int. Cl.
*H04W 72/00* (2009.01)
*H04W 24/10* (2009.01)
*H04L 5/00* (2006.01)

(56) References Cited

U.S. PATENT DOCUMENTS

| | | | |
|---|---|---|---|
| 8,660,086 | B2 | 2/2014 | Bazzo et al. |
| 8,666,317 | B2 | 3/2014 | Choudhury et al. |
| 8,824,382 | B2 | 9/2014 | Shu et al. |
| 8,831,596 | B2 | 9/2014 | Vainikka et al. |
| 8,942,744 | B2 | 1/2015 | Cho et al. |
| 9,025,536 | B2 | 5/2015 | Krishnaswamy |
| 9,277,416 | B2 | 3/2016 | Li et al. |
| 2013/0070626 | A1* | 3/2013 | Gaal ................ H04W 48/16 370/252 |
| 2013/0102314 | A1 | 4/2013 | Koskela et al. |
| 2013/0322371 | A1 | 12/2013 | Prakash et al. |
| 2015/0036509 | A1 | 2/2015 | Lopes et al. |
| 2015/0181481 | A1 | 6/2015 | Masini et al. |
| 2015/0245255 | A1 | 8/2015 | Van et al. |
| 2015/0304902 | A1* | 10/2015 | Yu .................. H04W 36/165 455/436 |
| 2015/0350960 | A1* | 12/2015 | Qiang ................ H04W 16/06 455/411 |
| 2016/0127912 | A1 | 5/2016 | Markwart et al. |
| 2016/0226562 | A1 | 8/2016 | Li et al. |

OTHER PUBLICATIONS

Jush J., et al., "Licensed shared access as complementary approach to meet spectrum demands: Benefits for next generation cellular systems", ETSI Workshop on Reconfigurable Radio Systems, Dec. 12, 2012 (Dec. 12, 2012), XP055143635, Retrieved from the Internet: URL: http://workshop.etsi.org/2012/201212 RRS/PAPERS/ ABSTRACT KHUNJUSH Final.doc.pdr [retrieved on Sep. 30, 2014]—abstract p. 2-p. 6.

Paulo M., et al., "Spectrum sharing in the EU and the path towards standardization", 2013 Future Network & Mobile Summit, Authors, Jul. 3, 2013 (Jul. 3, 2013), pp. 1-9, XP032506947, [retrieved on Oct. 15, 2013] p. 3-p. 5.

Xincheng Z., et al., "Self-Organizing Network—Chapter 6" In: "LTE-Advanced Air Interface Technology", Sep. 5, 2012 (Sep. 5, 2012), CRC Press, XP055143638, ISBN: 978-1-46-650153-9 pp. 361-390, p. 365 p. 382-p. 387.

* cited by examiner

FIG. 1
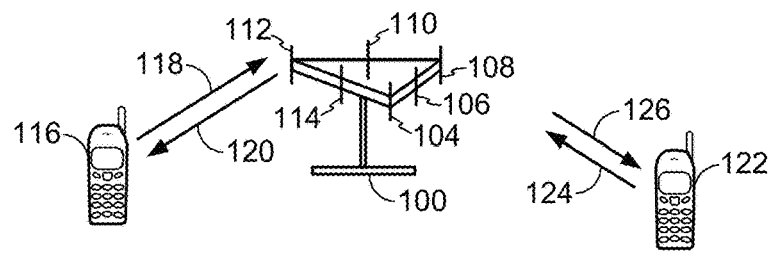
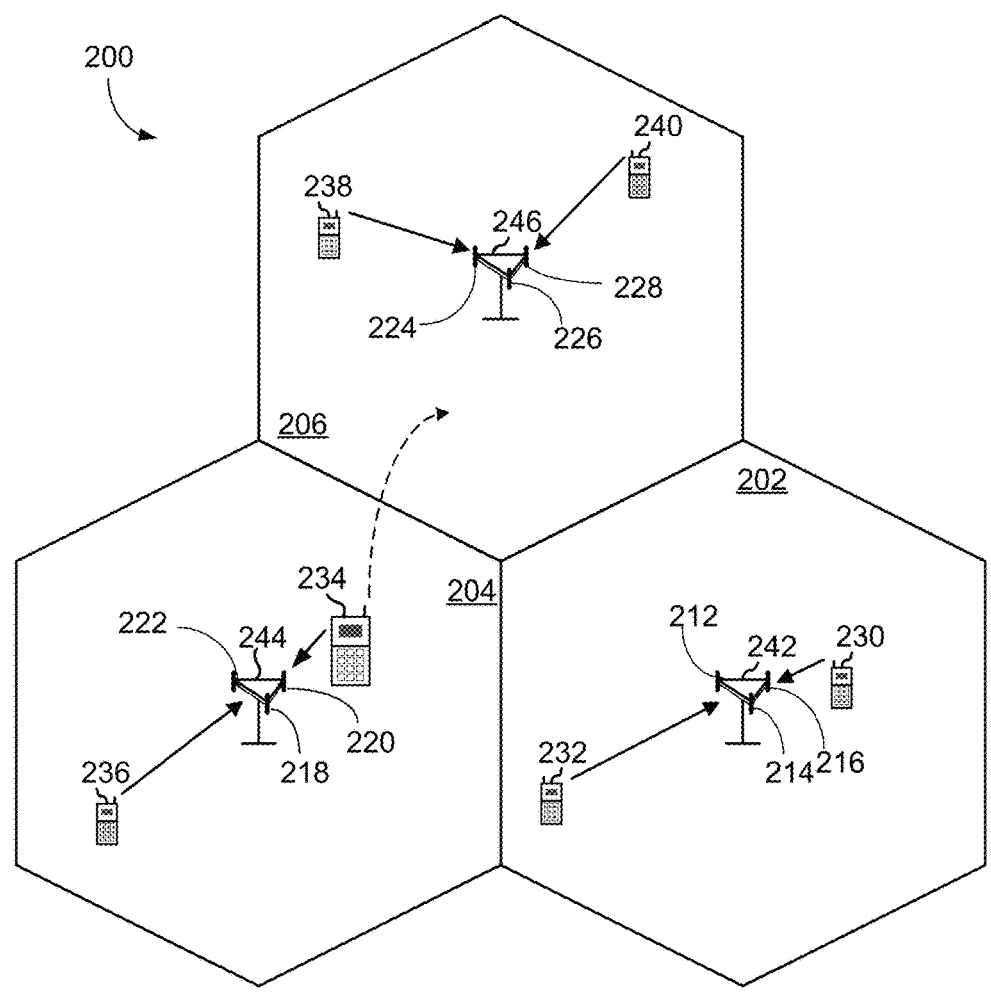
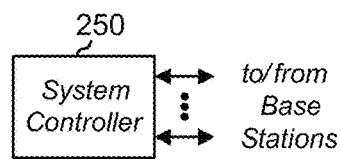
FIG. 2

| DEVICE TYPE | DEVICE CLASS | TYPICAL CONDUCTED Tx POWER (W) | | TYPICAL ANTENNA GAIN (dBi) | | TYPICAL ANTENNA HEIGHT (m) | |
|---|---|---|---|---|---|---|---|
| | | LOWER LIMIT | UPPER LIMIT | LOWER LIMIT | UPPER LIMIT | LOWER LIMIT | UPPER LIMIT |
| BASE STATION | WIDE AREA BASE STATION (MACRO CELL) | 10 | 40 | 10 | 18 | 10 | 30 |
| | LOCAL AREA BASE STATION (PICO CELL) | 0.2 | 2 | 0 | 10 | 1 | 10 |
| | HOME BASE STATION (FEMTO CELL) | 0.1 | 0.2 | 0 | 0 | 1 | 2 |
| UE | POWER CLASS 3 | $10^{-7}$ | 0.2 | -5 | 0 | 0 | 2 |

| MESSAGE NAME | REQUEST/RESPONSE | DESCRIPTION |
|---|---|---|
| AUTHORIZATION GRANT | RESPONSE | ACKNOWLEDGES RECEIPT OF AUTHORIZATION REQUEST AND ALLOWS OPERATION WITH PARAMETERS LISTED IN THE REQUEST |
| AUTHORIZATION REJECT | RESPONSE | REJECT AUTHORIZATION REQUEST WITH CAUSE CODE. MAY ALLOW OR DISALLOW NEGOTIATION, I.E. SUBMISSION OF REQUEST WITH DIFFERENT PARAMETERS |
| EXCLUSION ZONE SETUP | CAN BE EITHER REQUEST OR RESPONSE | DESCRIBES ONE OR MULTIPLE AREAS WITH ASSOCIATED EXCLUSION ZONE PARAMETERS |
| DEPLOYMENT STATUS QUERY | REQUEST | REQUESTS A STATIC RECORD OF DEVICE DEPLOYMENT IN A PARTICULAR AREA AND FREQUENCY. |
| OPERATIONAL STATUS QUERY | REQUEST | REQUESTS A DYNAMIC RECORD OF NETWORK OPERATIONAL STATUS, SUCH AS NETWORK ACTIVITY, POWER LEVELS. ACTION TIME CAN BE PAST, PRESENT OR FUTURE. |
| DEVICE OPERATIONAL STATUS QUERY | REQUEST | REQUESTS A DYNAMIC RECORD OF MOBILE DEVICE STATUS, SUCH AS DEVICE IDS, POWER LEVELS. ACTION TIME CAN BE PAST OR PRESENT BUT NOT FUTURE. |
| NOTICE OF VIOLATION | RESPONSE/UNSOLICITED | DESCRIBES OCCURRENCE OF ELEVATED INTERFERENCE. MAY INCLUDE IN THE SAME SESSION A PROVIDE EXCLUSION ZONE UPDATE MESSAGE |
| KEEP ALIVE MESSAGE | RESPONSE | RESPONSE TO 'HEARTBEAT' SIGNAL FROM ASA NETWORK MANAGER. MAY INCLUDE MESSAGE AND SESSION TAG OF LAST MESSAGE SENT. |
| RESET | REQUEST | INDICATES CANCELLATION OF ALL ONGOING SESSIONS AND DIRECTS THE ASA CONTROLLER TO RETURN TO A PRE-DEFINED INITIAL STATE. |
| SESSION INITIATION | RESPONSE/UNSOLICITED | INCLUDES CAUSE CODE AND NEW SESSION TAG |
| SESSION TERMINATION | RESPONSE/UNSOLICITED | INCLUDES CAUSE CODE AND SESSION TAG |
| PRIMARY NETWORK OPERATIONAL STATUS REPORT | RESPONSE/OPTIONAL | PROVIDES OPTIONAL INFORMATION ON PRIMARY NETWORK TRANSIT ACTIVITY TO HELP SECONDARY LICENSEE OPERATION. MAY INCLUDE EITHER NETWORK OPERATION RECORD OR 'REVERSE' PROTECTION ZONE PARAMETERS |

*FIG. 26*

| MESSAGE NAME | REQUEST/RESPONSE | DESCRIPTION |
| --- | --- | --- |
| AUTHORIZATION REQUEST | REQUEST | REQUESTS OPERATION IN AN ASA CHANNEL. INCLUDES LIST OF NETWORK OPERATION RECORDS AND/OR TRANSMITTER PARAMETER RECORDS (SEE SECTION 6.3.4) |
| EXCLUSION ZONE REQUEST | REQUEST | REQUESTS APPLICABLE EXCLUSION ZONE PARAMETERS. REFERENCE TIME CAN BE CURRENT OR FUTURE. |
| EXCLUSION ZONE SETUP ACKNOWLEDGE PARAMETER RECORD UPDATE | REQUEST | ACKNOWLEDGES RECEIPT OF EXCLUSION ZONE PARAMETERS. MAY INCLUDE EXPECTED TIME OF COMPLIANCE IF EXCLUSION ZONE PARAMETER ACTION TIME WAS IMMEDIATE. |
| DEPLOYMENT STATUS REPORT | RESPONSE | PROVIDES A STATIC RECORD OF DEVICE DEPLOYMENT IN A PARTICULAR AREA AND FREQUENCY. |
| NETWORK OPERATIONAL STATUS REPORT | RESPONSE | PROVIDES A DYNAMIC RECORD OF NETWORK OPERATIONAL STATUS, SUCH AS NETWORK ACTIVITY, POWER LEVELS. REFERENCE TIME BASED ON REQUEST. |
| DEVICE OPERATIONAL STATUS REPORT | RESPONSE | PROVIDES A DYNAMIC RECORD OF MOBILE DEVICE STATUS, SUCH AS DEVICE IDS, POWER LEVELS. REFERENCE TIME BASED ON REQUEST. |
| NOTICE OF VIOLATION ACKNOWLEDGE | RESPONSE | DESCRIBES NETWORK OPERATIONAL STATUS UPDATE IN RESPONSE TO NOTICE OF VIOLATION. MAY INCLUDE ACTION TIME IF COMPLIANCE IS NOT IMMEDIATE. |
| KEEP ALIVE ACKNOWLEDGE | RESPONSE | 'HEARTBEAT' SIGNAL TO ASA NETWORK MANAGER. MAY INCLUDE MESSAGE AND SESSION TAG OF LAST MESSAGE SENT. IF NO RESPONSE IS RECEIVED WITHIN TIMER EXPIRY, THE ASA NETWORK MANAGER RETURNS TO A PREDEFINED RESET STATE. |
| RESET ACKNOWLEDGMENT | RESPONSE | ACKNOWLEDGES CANCELLATION OF ALL ONGOING SESSIONS AND RETURNING TO A PRE-DEFINED INITIAL STATE. MAY INCLUDE ACTION TIME IF RESET IS NOT IMMEDIATE |
| SESSION INITIATION | RESPONSE/UNSOLICITED | INCLUDES CAUSE CODE AND NEW SESSION TAG |
| PRIMARY NETWORK OPERATIONAL STATUS QUERY | REQUEST/OPTIONAL | REQUESTS OPTIONAL INFORMATION ON PRIMARY NETWORK TRANSMIT ACTIVITY TO HELP SECONDARY LICENSEE OPERATION. MAY INCLUDE SECONDARY LICENSEE NETWORK OPERATION STATUS |

FIG. 27

| MESSAGE NAME | REQUEST/RESPONSE | DESCRIPTION |
|---|---|---|
| EXCLUSION ZONE SETUP | CAN BE EITHER REQUEST OR RESPONSE | DESCRIBES ONE OR MULTIPLE AREAS WITH ASSOCIATED EXCLUSION ZONE PARAMETERS |
| KEEP ALIVE MESSAGE | RESPONSE | RESPONSE TO 'HEARTBEAT' SIGNAL FROM ASA NETWORK MANAGER. MAY INCLUDE MESSAGE AND SESSION TAG OF LAST MESSAGE SENT. |
| RESET | REQUEST | INDICATES CANCELLATION OF ALL ONGOING SESSIONS AND DIRECTS THE ASA CONTROLLER TO RETURN TO A PRE-DEFINED INITIAL STATE. |
| SESSION INITIATION | RESPONSE/UNSOLICITED | INCLUDES CAUSE CODE AND NEW SESSION TAG |
| SESSION TERMINATION | RESPONSE/UNSOLICITED | INCLUDES CAUSE CODE AND SESSION TAG |

*FIG. 28*

| MESSAGE NAME | REQUEST/RESPONSE | DESCRIPTION |
|---|---|---|
| EXCLUSION ZONE SETUP UPDATE | RESPONSE | ACKNOWLEDGES RECEIPT OF EXCLUSION ZONE PARAMETERS. MAY INCLUDE EXPECTED TIME OF COMPLIANCE IF EXCLUSION ZONE PARAMETER ACTION TIME WAS IMMEDIATE. |
| KEEP ALIVE RESPONSE | REQUEST | 'HEARTBEAT' SIGNAL TO ASA NETWORK MANAGER. MAY INCLUDE MESSAGE AND SESSION TAG OF LAST MESSAGE SENT. IF NO RESPONSE IS RECEIVED WITHIN TIMER EXPIRY, THE ASA NETWORK MANAGER RETURNS TO A PREDEFINED RESET STATE. |
| RESET ACKNOWLEDGEMENT | RESPONSE | ACKNOWLEDGES CANCELLATION OF ALL ONGOING SESSIONS AND RETURNING TO A PRE-DEFINED INITIAL STATE. MAY INCLUDE ACTION TIME IS RESET IS NOT IMMEDIATE. |
| SESSION INITIATION | RESPONSE/UNSOLICITED | INCLUDES CAUSE CODE AND NEW SESSION TAG |

*FIG. 29*

VERIFICATION OF AUTHORIZED SHARED ACCESS OPERATION

CROSS-REFERENCE TO RELATED APPLICATION

This application is a continuation of U.S. patent application Ser. No. 14/448,806, entitled "VERIFICATION OF AUTHORIZED SHARED ACCESS OPERATION," filed on Jul. 31, 2014, which claims the benefit under 35 U.S.C. § 119(e) to U.S. Provisional Patent Application No. 61/862,364, entitled "VERIFICATION OF AUTHORIZED SHARED ACCESS OPERATION," filed on Aug. 5, 2013, the disclosures of which are expressly incorporated by reference herein in their entirety.

FIELD

This application is directed generally to wireless communications systems. More particularly, but not exclusively, the application relates to systems and apparatus for verification of authorized shared access operation.

BACKGROUND

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also known as user equipments (UEs), user terminals, or access terminals (ATs)). Each terminal communicates with one or more base stations (also known as access points (APs), eNodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

Newer multiple access systems, for example, LTE, deliver faster data throughput than older technologies. Faster downlink rates, in turn, have sparked a greater demand for higher-bandwidth content, such as high-resolution graphics and video, for use on or with mobile devices. Therefore, demand for bandwidth on wireless communications systems continues to increase despite availability of higher data throughput over wireless interfaces, and this trend is likely to continue. However, wireless spectrum is a limited and regulated resource. Therefore, new approaches are needed in wireless communications to more fully utilize this limited resource and satisfy consumer demand.

SUMMARY

In one aspect of the present disclosure, a method of wireless communication is disclosed. The method includes receiving measurement reports from multiple first wireless devices operating in a specific area and operating on a spectrum that is different from an authorized shared access (ASA) spectrum. The method also includes adjusting a configuration for one or more second wireless devices operating on the ASA spectrum based on the measurement reports and/or configuration adjustment information.

Another aspect of the present disclosure is directed to an apparatus including means for receiving measurement reports from multiple first wireless devices operating in a specific area and operating on a spectrum that is different from an ASA spectrum. The apparatus also includes means for adjusting a configuration for one or more second wireless devices operating on the ASA spectrum based on the measurement reports and/or configuration adjustment information.

In another aspect of the present disclosure, a computer program product for wireless communications in a wireless network is disclosed. The computer readable medium has non-transitory program code recorded thereon which, when executed by the processor(s), causes the processor(s) to perform operations of receiving measurement reports from multiple first wireless devices operating in a specific area and operating on a spectrum that is different from an ASA spectrum. The program code also causes the processor(s) to adjust a configuration for one or more second wireless devices operating on the ASA spectrum based on the measurement reports and/or configuration adjustment information.

Another aspect of the present disclosure is directed to an apparatus for wireless communications. That apparatus has a memory and at least one processor coupled to the memory. The processor(s) is configured to receive measurement reports from multiple first wireless devices operating in a specific area and operating on a spectrum that is different from an ASA spectrum. The processor(s) is also configured to adjust a configuration for one or more second wireless devices operating on the ASA spectrum based on the measurement reports and/or configuration adjustment information.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The present application may be more fully appreciated in connection with the following detailed description taken in conjunction with the accompanying drawings.

FIG. 1 illustrates details of a wireless communication system.

FIG. 2 illustrates details of a wireless communication system having multiple cells.

FIG. 26 is a TABLE showing examples of message types for an ASA-1 interface forward direction.

FIG. 27 is a TABLE showing examples of message types for an ASA-1 interface reverse direction.

FIG. 28 is a TABLE showing examples of message types for an ASA-2 interface forward direction.

FIG. 29 is a TABLE showing examples of message types for an ASA-2 interface reverse direction.

DETAILED DESCRIPTION

Figure 3:
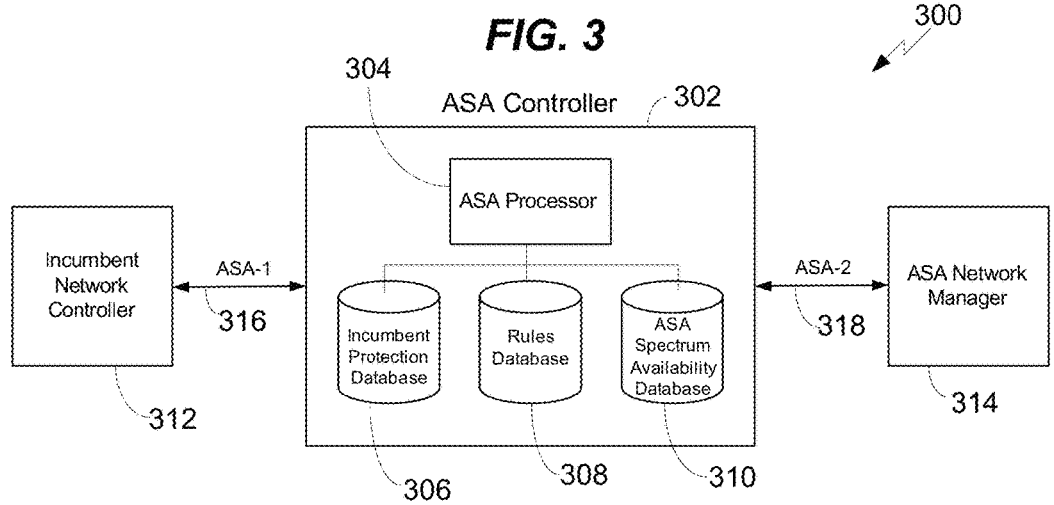
FIG. 3 is a block diagram showing aspects of an Authorized Shared Access (ASA) controller coupled to different wireless communication systems including one primary user and one secondary user.

This disclosure relates generally to providing or participating in authorized shared access between two or more wireless communications systems, also referred to as wireless communications networks. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, GSM networks, as well as other communications networks. As described herein, the terms "networks" and "systems" may be used interchangeably.

A CDMA network may implement a radio technology such as Universal Terrestrial Radio Access (UTRA), cdma2000, and the like. UTRA includes Wideband-CDMA (W-CDMA) and Low Chip Rate (LCR). Cdma2000 covers IS-2000, IS-95, and IS-856 standards.

A TDMA network may implement a radio technology such as Global System for Mobile Communications (GSM). 3GPP defines standards for the GSM EDGE (Enhanced Data Rates for GSM Evolution) Radio Access Network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the Public Switched Telephone Network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different Radio Access Technologies (RATs) and Radio Access Networks (RANs).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques may be described below for LTE implementations or in an LTEcentric way, and LTE terminology may be used as illustrative examples in portions of the description below; however, the description is not intended to be limited to LTE applications. Indeed, the present disclosure is concerned with shared access to wireless spectrum between networks using different Radio Access Technologies or Radio Air Interfaces. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may use time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g., sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer-readable medium for execution on a processor or computer. Furthermore, an aspect may comprise at least one element of a claim.

FIG. 1 illustrates details of an implementation of a multiple access wireless communication system, which may be an LTE system, on which aspects as further described subsequently may be implemented. An evolved NodeB (eNB) 100 (also known as a base station, access point or AP) may include multiple antenna groups, one including 104 and 106, another including 108 and 110, and an additional including 112 and 114. In FIG. 1, only two antennas are shown for each antenna group; however, more or fewer antennas may be utilized for each antenna group. A user equipment (UE) 116 (also known as an user terminal, access terminal, or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 may be in communication with antennas 104 and 106, where antennas 104 and 106 transmit information to UE 122 over forward link 126 and receive information from UEs 122 over reverse link 124.

In a frequency division duplex (FDD) system, communication links 118, 120, 124 and 126 may use different frequencies for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 100 utilize beamforming in order to improve the signal-to-noise ratio of forward links for the different UEs 116 and 122. Also, an eNB using beamforming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology. UEs, such as UE 116 and 122, may be further configured to operate with other nodes of other communication networks (not shown), such as, for example, GERAN and/or UTRAN networks. Moreover, base stations, such as eNB 100, may be configured to facilitate handover of served UEs to base stations of the other networks, such as through use of a redirection command.

FIG. 2 illustrates details of an implementation of a multiple access wireless communication system 200, such as an LTE system, on which aspects, such as are described subsequently herein, may be implemented. The multiple access wireless communication system 200 includes multiple cells, including cells 202, 204, and 206. In one aspect, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204, and 206 can include several wireless communication devices (e.g., user equipment or UEs) which can be in communication with one or more sectors of each cell 202, 204, or 206. For example, UEs 230 and 232 can be in communication with eNB 242, UEs 234 and 236 can be in communication with eNB 244, and UEs 238 and 240 can be in communication with eNB 246. The cells and associated base stations may be coupled to a system controller 250, which may be part of a core or backhaul network or may provide connectivity to a core or backhaul network, including, for example, an MME and SGW, such as may be used to perform functions as further described herein related to multimode coordination and operation, as well as other aspects described herein.

An operator's system may include multiple networks, which may be of multiple types (for example, in addition to the LTE network configurations shown in FIGS. 2 and 3) using different RATs. For example, one type may be an LTE system, which is data-centric. Another type may be a UTRAN system, such as a W-CDMA system. Yet another type may be a GERAN system, which may in some cases be Dual Transfer Mode (DTM) capable (also denoted herein as a DTM GERAN). Some GERAN networks may be non-DTM capable. Multimode user terminals, such as UEs, may be configured to operate in multiple networks, such as these, as well as other (e.g., WiFi or WiMax networks, etc.).

Authorized Shared Access

Authorized shared access (ASA) allocates, to a secondary user(s), portions of spectrum that are not continuously used by an incumbent system(s). The incumbent system may be referred to as a primary licensee or a primary user that is given a primary license for a band of frequencies. The incumbent system may not use the entire frequency band in all locations and/or at all times. The secondary user may be referred to as a secondary licensee or a secondary network. Aspects of the present disclosure are directed to an ASA implementation. Still, the ASA technology is not limited to the illustrated configurations as other configurations are also contemplated. The ASA spectrum refers to portion(s) of a spectrum that is not used by a primary user and has been licensed for use by a secondary user, such as an ASA operator. ASA spectrum availability may be specified by location, frequency, and/or time. It should be noted that the authorized shared access may also be referred to as licensed shared access (LSA).

ASA Architecture

In one configuration, as shown in FIG. 3, an ASA architecture 300 includes an ASA controller 302 coupled to an incumbent network controller 312 of a primary user and an ASA network manager 314 of an ASA network. The primary user may be a primary ASA licensee and the ASA network may be a secondary user.

In one configuration, the incumbent network controller is a network entity operated by the primary user that controls and/or manages the network operating in the ASA spectrum. Furthermore, the ASA network manager may be a network entity operated by the ASA network operator that controls and/or manages an associated network, including but not limited to the devices operating in the ASA spectrum. Additionally, the secondary licensee may be a wireless network operator that has obtained an ASA license to use the ASA spectrum. Furthermore, in one configuration, the ASA controller is a network entity that receives information from the incumbent network controller on the available ASA spectrum that may be used by an ASA network. The ASA controller may also transmit control information to the ASA network manager to notify the ASA network manager of the available ASA spectrum.

In the present configuration, the incumbent network controller 312 is aware of the use of the ASA spectrum by the primary user at specified times and/or locations. The incumbent network controller 312 may provide information to the ASA controller 302 for the incumbent usage of the ASA spectrum. There are several methods that the incumbent network controller 312 can use to provide this information to the ASA controller 302. In one configuration, the incumbent network controller 312 provides a set of exclusion zones and/or exclusion times to the ASA controller 302. In another configuration, the incumbent network controller 312 specifies a threshold for allowed interference at a set of locations. The threshold for allowed interference may be referred to as incumbent protection information. In this configuration, the incumbent protection information is transmitted to the ASA controller 302 over an ASA-1 interface 316. Incumbent protection information may be stored by the ASA controller 302 in a database 306.

The ASA-1 interface refers to the interface between the primary user and the ASA controller. The ASA-2 interface refers to the interface between the ASA controller and the ASA network management system. Moreover, the ASA-3 interface refers to the interface between the ASA network manager and the ASA network elements. Furthermore, geographic sharing refers to an ASA sharing model in which the ASA network can operate throughout a geographic region for an extended period of time. The network is not permitted to operate in regions specified by exclusion zones.

The ASA controller 302 uses the information from the incumbent network controller 312 to determine the ASA spectrum that may be used by the ASA network. That is, the ASA controller 302 determines the ASA spectrum that may be used for a specific time and/or a specific location based on rules specified in a rules database 308. The rules database 308 may be accessed by an ASA processor 304 and stores the regulatory rules that are set by local regulations. These rules may not be modified by the ASA-1 or the ASA-2 interfaces, and may be updated by the individual or organization that manages the ASA controller 302. The available ASA spectrum, as calculated by the rules in the rules database 308, may be stored in the ASA spectrum availability database 310.

The ASA controller 302 may send information to the ASA network manager 314 on the available ASA spectrum via an ASA-2 interface 318, based on the spectrum availability database. The ASA network manager 314 may know or determine the geographic location of base stations under its control and also information about the transmission characteristics of these base stations, such as transmit power and/or supported frequencies of operation. The ASA network manager 314 may query the ASA controller 302 to discover the available ASA spectrum in a given location or a geographic region. Also, the ASA controller 302 may notify the ASA network manager 314 of any updates to the ASA spectrum availability in real-time. This allows the ASA controller 302 to notify the ASA network manager 314 if the ASA spectrum is no longer available, so that the ASA network can stop using that spectrum and the incumbent network controller 312 can obtain exclusive access to the ASA spectrum in real time.

The ASA network manager 314 may be embedded in a standard network element, depending on the core network technology. For example, if the ASA network is a long term evolution (LTE) network, the ASA network manager can be embedded in an operations, administration, and maintenance (OAM) server.

Figure 4:
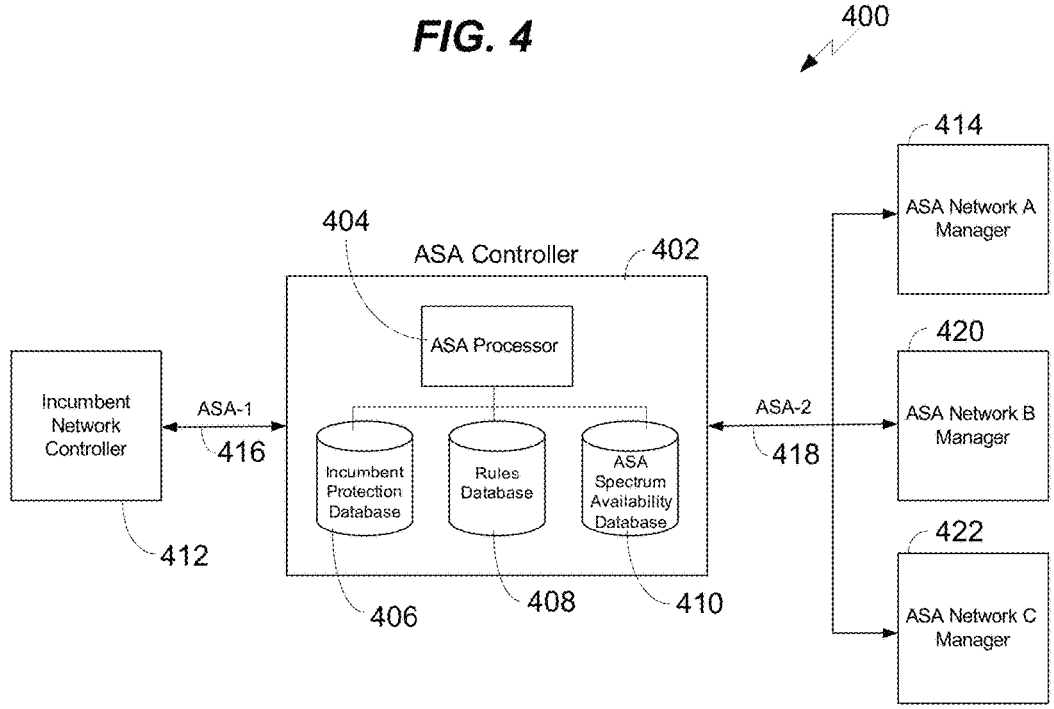
FIG. 4 is a block diagram showing aspects of an ASA controller coupled to different wireless communication systems including one primary user and multiple secondary users.

In FIG. 4, an incumbent network controller and a single ASA network manager are illustrated as being coupled to the ASA controller. It is also possible for multiple ASA networks (e.g., ASA network A, ASA network B and ASA network C) to be connected to an ASA controller 402, as in a system 400 shown in FIG. 4. ASA network A includes an ASA network A manager 414 coupled to the ASA controller 402, ASA network B includes an ASA network B manager 420 coupled to the ASA controller 402, and ASA network C includes an ASA network C manager 422 coupled to the ASA controller 402.

In this example, the multiple ASA networks may share the same ASA spectrum. The ASA spectrum may be shared via various implementations. In one example, the ASA spectrum is shared for a given region, so that each network is restricted to a subband within the ASA spectrum. In another example, the ASA networks share the ASA spectrum by using timing synchronization and scheduling the channel access of the different networks.

The system 400 may further include an incumbent network controller 412 of a primary user communicating with the ASA controller 402 via an ASA-1 interface 416, to provide incumbent protection information for a database 406. The ASA controller 402 may include a processor 404 coupled to a rules database 408 and ASA spectrum availability database 410. The ASA controller 402 may communicate with the ASA network managers 414, 420 and 422 via an ASA-2 interface 418. The ASA networks A, B, C may be secondary users.

Figure 5:
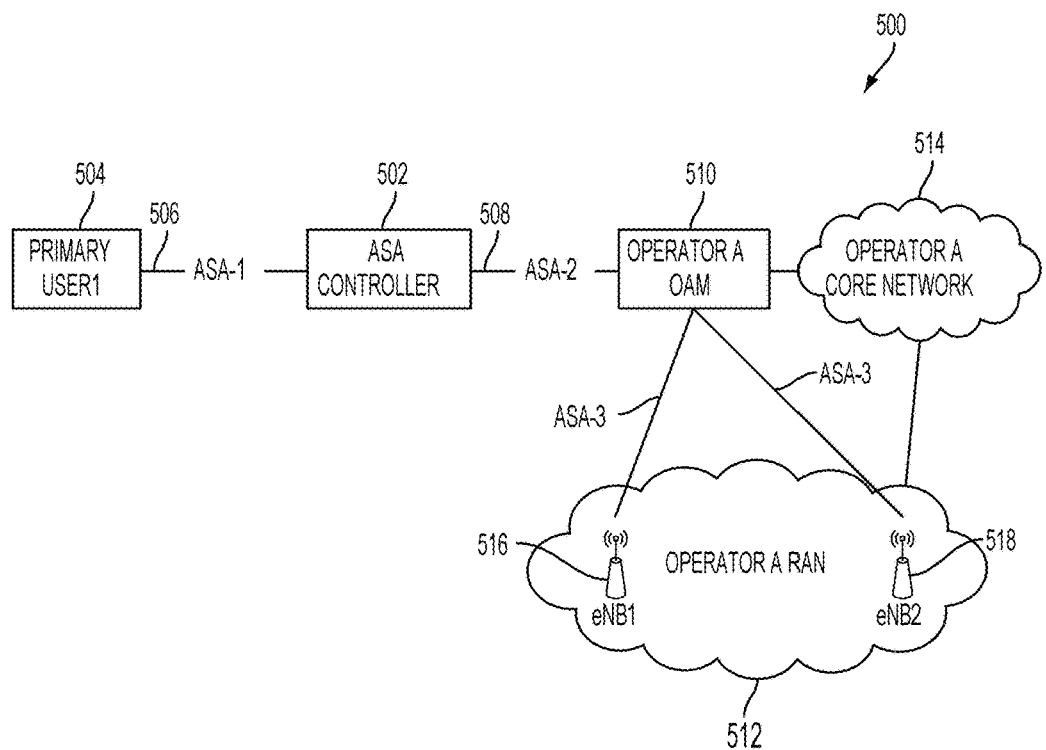
FIG. 5 is a block diagram showing aspects of an ASA controller coupled to different wireless communication systems and elements within a secondary user for supporting ASA.

The ASA network manager(s) may interact with various network elements, such as eNodeBs, to achieve the desired spectrum use control. The interaction may be implemented via the ASA-3 interface as shown in FIG. 5. As shown in FIG. 5, a system 500 includes ASA-3 interfaces between the eNodeBs 516, 518 in the Radio Access Network 512 and an ASA network manager node embedded in an operations, administration, and maintenance server 510. The Radio Access Network 512 may be coupled to a core network 514. An ASA controller 502 may be coupled to the operations, administration, and maintenance server 510 via an ASA-2 interface 508 and to a network controller of a primary user 504 via an ASA-1 interface 506.

In some cases, multiple incumbent network controllers are specified for the same ASA spectrum. That is, a single incumbent network controller may provide information about incumbent protection for a given ASA frequency band. Therefore, the architecture may be limited to a single incumbent network controller. However, it is noted that multiple incumbent network controllers may be supported. Still, it may be desirable to limit the network to a single incumbent network controller.

ASA Operations

Interfaces and certain aspects for controlling ASA conditions are described for various aspects of the present disclosure. In actual deployments, the ASA operational conditions may differ in terms of a specified level of protection, sensitivity of information sharing, time scale of operating mode changes, predictability and accuracy of network operational parameters, and/or knowledge of propagation conditions and/or RF environment.

The control logic for conventional systems may be designed to only manage minor changes to the system over time. Aspects of the presented disclosure are directed to improved control logic. A list of operational assumptions is provided in TABLE 1.

TABLE 1

| Target specifications for ASA functions | |
| --- | --- |
| Required functionality | Assumption |
| Handling of cumulative interference | Intelligent partitioning is used (i.e., granting authorization to operate is not based on adding worst case assumptions regarding interference caused). Note that the intelligent partitioning is related to the difference between exclusion zones and protection zones described elsewhere herein |
| Time scale of changes for vacating spectrum | Instantaneous messaging. Compliance with vacate request within a few seconds |
| Time scale of changes for occupying spectrum | Delay between ASA spectrum being indicated available and both base stations and UEs operating in an ASA spectrum. Specifications may be relaxed compared to time allowed for vacating the spectrum. |
| Geolocation capability | Secondary user access points have geolocation capability. Geolocation accuracy estimates are available at least over ASA-3. Mobile devices do not have geolocation capability |
| Sensing capability | Not assumed |
| Air-interface technology | No assumption on primary user spectrum use (can be communication link, beacon signal, radar) LTE operation by secondary user is assumed |

TABLE 1-continued

Target specifications for ASA functions

| Required functionality | Assumption |
|---|---|
| Duplex arrangement | DL and/or UL of secondary user may operate in ASA spectrum. Either FDD or TDD operation |
| Intra-ASA Interference direction | band Provide interference protection for primary user. Provide primary to secondary interference information to secondary user. |
| Interference into ASA band and from ASA band | A set of new specifications should be defined as needed on an ASA band specific basis for compliance with specifications for protection of channels adjacent to the ASA band and to enable operation in the presence of interference from those adjacent channels. |
| Parameter concealment | It is a desirable feature to be able to hide primary user operation details from secondary users and to hide secondary user operation details from each other. It is not an objective to hide secondary user operation details from the primary user, although some ASA controller operation model could enable this feature. |
| Service continuity | Connection loss should be handled and detected at the ASA protocol level. |

The improved design presented for aspects of the present disclosure target the specifications listed in TABLE 1. A simplified design, targeting initial deployments, is specified in TABLE 2.

TABLE 2

Target requirements for the simplified ASA design
(items with '*' differ from the modified design)

| Required functionality | Assumption |
|---|---|
| Handling of cumulative interference (*) | Intelligent partitioning is not specified (i.e., granting authorization to operate can be based on worst case assumptions). |
| Time scale of changes for vacating spectrum | Instantaneous messaging. Compliance with vacate request should be performed within a few seconds |
| Time scale of changes for occupying spectrum | Delay between ASA spectrum being indicated available and both base stations and UEs operating in ASA spectrum. Specifications may be relaxed compared to time allowed for vacating the spectrum. |
| Geolocation capability | Secondary user access points have geolocation capability. |
| Sensing capability | Mobile devices do not have geolocation capability. Not assumed |
| Air-interface technology | No assumption on primary user spectrum use (can be communication link, beacon signal, radar) LTE operation by secondary user is assumed |
| Duplex arrangement | DL and/or UL of secondary user may operate in ASA spectrum. Either FDD or TDD operation |
| Intra-ASA band Interference direction (*) | Provide interference protection for primary user. |
| Interference into ASA band and from ASA band | Specifications should be defined as needed on an ASA band specific basis for compliance with specifications for protection of channels adjacent to the ASA band and to enable operation in the presence of interference from those adjacent channels. |
| Parameter concealment | It is a desirable feature to be able to hide primary user operation details from secondary users and to hide secondary user operation details from primary user. |
| Service continuity | Connection loss has to be handled and detected at the ASA protocol level. |

In one configuration, interface standardization is not a requirement, although the possibility of standardization is not precluded.

Improved ASA Design

ASA-1 Interface

The messages that are sent over the ASA-1 interface are described below. The content of each message is provided and the specific network protocol, including security, is also discussed below.

There are several methods that can be used to specify protection of an incumbent network. One method is to specify a geographic area of support and exclusion zones within that geographic area. Another method is to specify a threshold for an allowed interference at a specific location or region.

Figure 6:
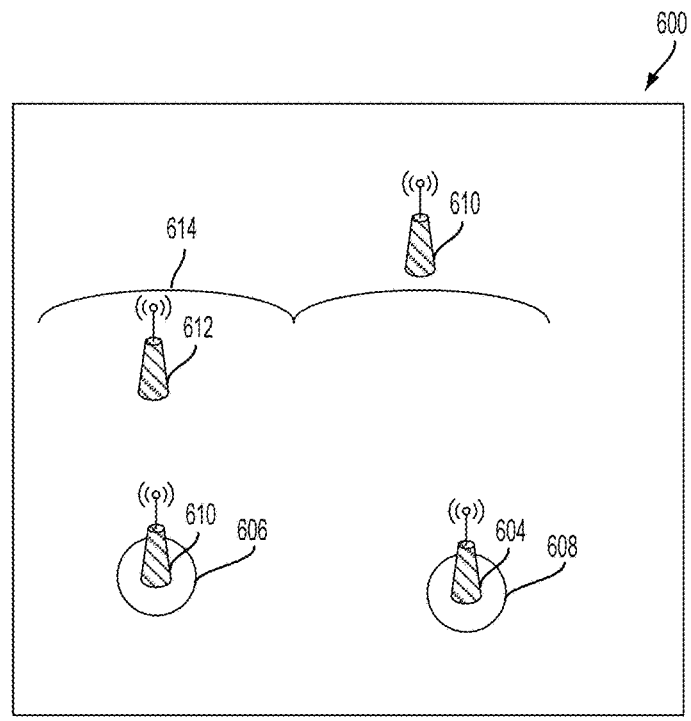
FIG. 6 is a schematic diagram showing aspects of protection zones and exclusion zone for facilitating ASA.

FIG. 6 illustrates exclusion zones and protection zones. An exclusion zone refers to a geographic region in which an ASA network is not permitted to operate. A protection zone refers to a geographic region in which interference from a secondary user is specified to be below a threshold in order to reduce interference experienced by the primary user. As shown in FIG. 6, a system 600 includes eNodeBs for primary and secondary users. Protection zones 606, 608 for the UEs 602, 604 of the primary user may be smaller in area than associated exclusion zones with a boundary 614 for transmitters 610, 612 of a secondary user. However, zone size does not define the difference between protection and exclusion zones. Protection zones are design targets for ASA, while exclusion zones may represent derived information that may be conveyed over the ASA interfaces. In one example, exclusion zones may be the only information conveyed over the ASA interfaces.

In some cases, protection zones are converted to exclusion zones for ASA operation. The conversion may be based on worst case assumptions for the secondary user network deployment or may be based on knowledge of the actual deployment. The latter may provide improved usage of the resources by reducing or even minimizing the exclusion zones as shown in the dynamic exclusion zone deployment 700 of FIG. 7. Static and dynamic exclusion parameter determination may be based on knowledge of actual deployment.

In some cases, the exclusion zones may be defined to apply only to wireless devices with certain characteristics, such as eNodeBs with a transmit power and/or antenna gain that is greater than a threshold. Applying exclusion zones to wireless devices with a specified characteristic allows for a flexible set of constraints and improves the use of available resources by the secondary user.

Figure 7:
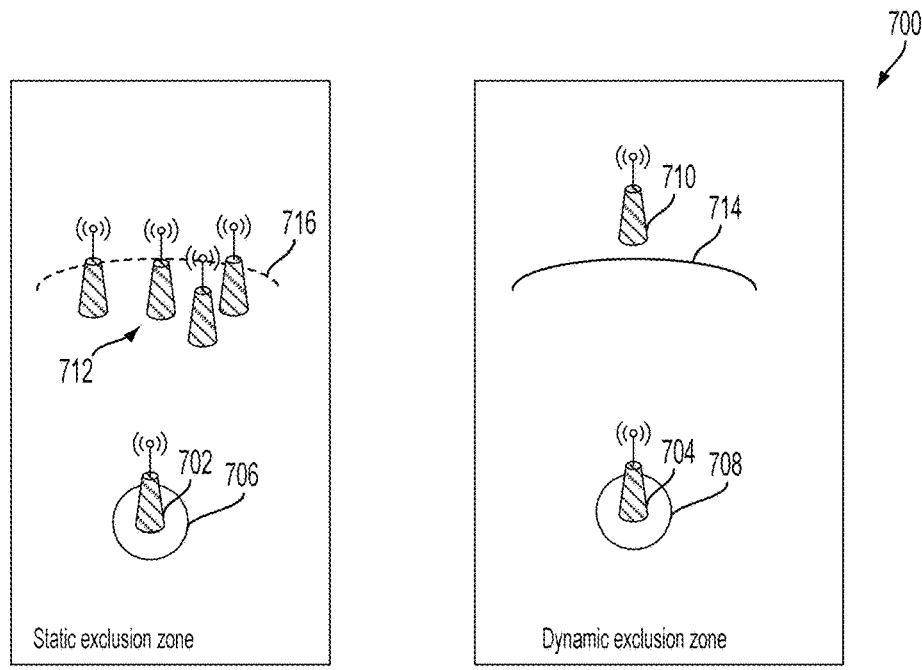
FIG. 7 is a schematic diagram showing further aspects of protection zones and exclusion zone for facilitating ASA.

As shown in FIG. 7, a primary user receiver 702 uses a protection zone 706. A static exclusion zone may be derived based on worst-case assumptions. The exclusion zone boundary 716 may be calculated to exclude interference from multiple worst-case (not actual deployed) transmitters 712 of the secondary user. Furthermore, as shown in FIG. 7, using the same or a similar protection zone 708 for the receiver 704, an exclusion zone boundary 714 based on known deployment of the transmitter 710 may encompass a smaller area than the boundary 716 based on a worst-case assumption.

Figure 8:
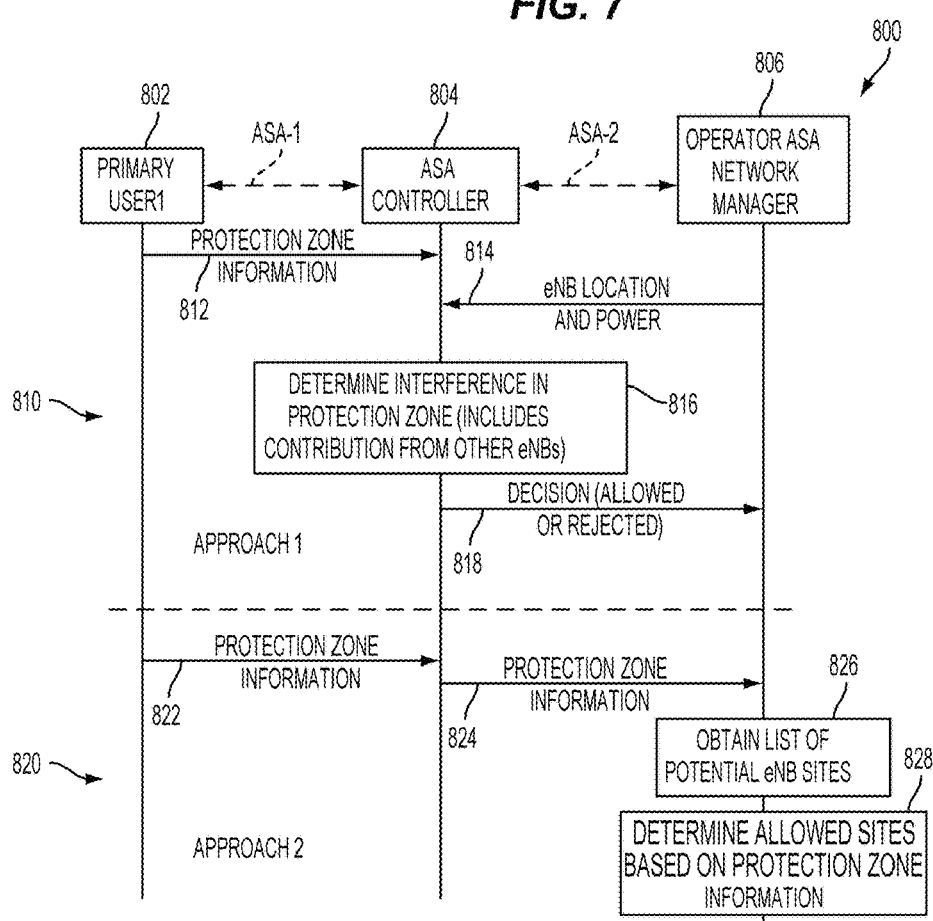
FIG. 8 is a sequence diagram showing examples of alternative approaches for determining an exclusion zone.

As shown in FIG. 8, various ASA control options and corresponding ASA interface design options may depend on where the protection zone to exclusion zone conversion is performed. In an improved design option, the conversion may be performed by the ASA controller 804. Alternatively, the conversion can be performed by the ASA network manager 806. These two options 800 are shown as a first approach 810 and a second approach 820, respectively, in FIG. 8.

In one configuration for network operations, the primary user 802 may provide protection zone information to the ASA controller 804 at time 812. Furthermore, at time 814, the ASA network manager 806 may provide system parameters to the ASA controller 804, such as eNodeB locations and transmit powers. At time 816, the ASA controller 804 may determine interference in the protection zone, including contribution from all eNodeBs of the secondary network. At time 818, the ASA controller 804 may transmit information to the network manager 806 indicating whether use of the shared spectrum is permitted at one or more eNodeB's of the secondary network.

In another configuration for network operations, the primary user 802 may provide protection zone information to the ASA controller 804 at time 822. Furthermore, at time 824 the ASA controller 804 may provide the protection zone information to the network manager 806. The network manager 806 may obtain a list of potential eNodeB sites (time 826) and determine allowed sites based on the protection zone information (time 828). In another configuration, the conversion is performed by the incumbent network controller and only exclusion zone parameters may be exchanged over the ASA interfaces. In another configuration, the incumbent network controller provides both exclusion zone information and protection zone information. Specifically, the exclusion zones are defined to avoid worst case interference scenarios and the ASA controller 804 extends the exclusion zones based on the protection zone information, knowledge of the propagation environment, and/or deployment details of the secondary network.

Exclusion Zones

For exclusion zone protection, a controller specifies a geographic area of support and exclusion zones within that geographic area. The geographic area may be, for example, a specific country and the exclusion zones may be regions within that country where an ASA network base station cannot transmit. For each of the exclusion zones, the valid time for that exclusion zone is included in the message. These exclusion zones may be overlapping, so that it is possible to exclude the entire geographic region with a single exclusion zone, and all the ASA networks will evacuate the ASA spectrum for that geographic area at the specified time. Furthermore, a validity time may be set for an exclusion zone to infinity, so that the region specified by the exclusion zone is always protected.

Each ASA-1 message may be specified by a table listing the elements of the message and the format of each element, as shown in TABLE 3 below.

The geographic area of support may be sent to the ASA controller and may be formatted as an ANSI string specifying a country using the ISO country code (e.g., "FR" for France) or an ANSI string with multiple country codes separated by a comma (e.g., "FR, DE" for France and Germany). For situations where the ASA controller may only operate in a single country, this message may not be used because the geographic area of support is known.

TABLE 3

| Geographic Area of Support | | |
|---|---|---|
| Field | Range of Values | Values |
| Geographic Area of Support | ASIC string | Country Code (ISO spec) |

Geographical areas for exclusion zones may be described in various formats. In one example, an explicit definition is specified so that the geographical area is described as an enclosure of a set of geometrical elements, such as points, lines, and/or curves with the coordinates being explicitly listed. In another example, an implicit definition is specified where the geographical area is described as an index that points to a list of predefined geographical areas. In another example, the reuse of other area definitions is specified. In this example, licensing area descriptions are used, such as administrative region, regional economic area groupings (REAGs), metropolitan statistical areas (MSAs), and/or rural service areas (RSAs).

Figures 9, 10:
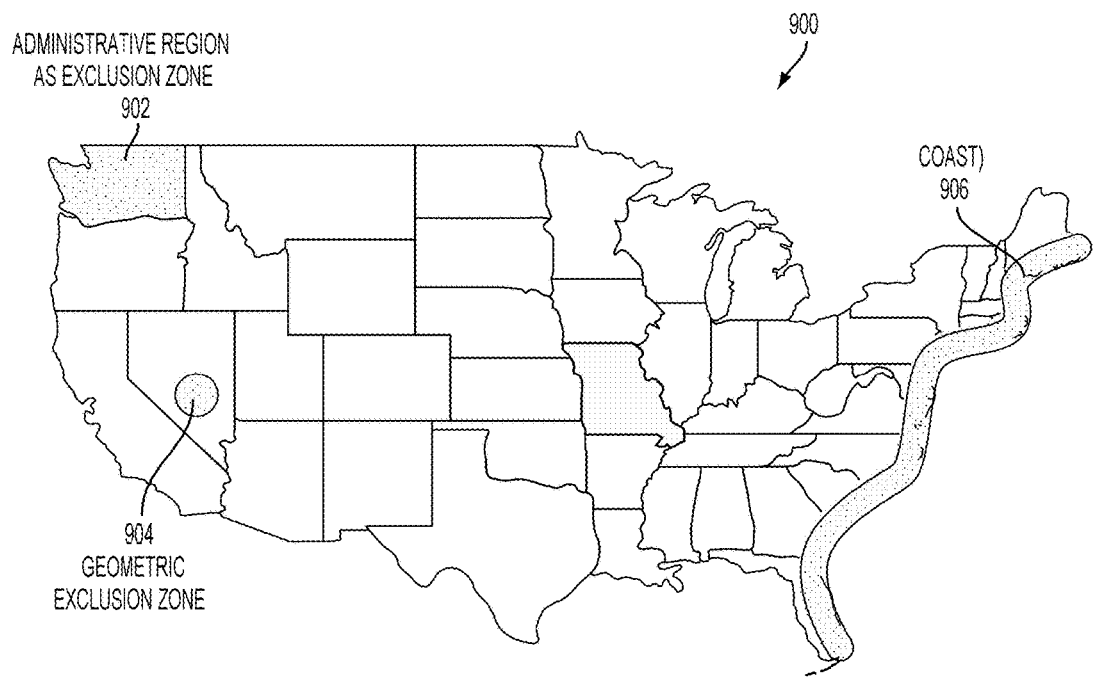
FIG. 9 is a map illustrating examples of various types of static exclusion zones.
FIG. 10 is a TABLE showing examples of power limits placed on transmitters based on transmitter class.

FIG. 9 illustrates the above examples. As shown in FIG. 9, a geographical map 900 includes examples of an administrative region exclusion zone 902, a geometric region exclusion zone 904, and a topographic exclusion zone 906.

Figure 11:
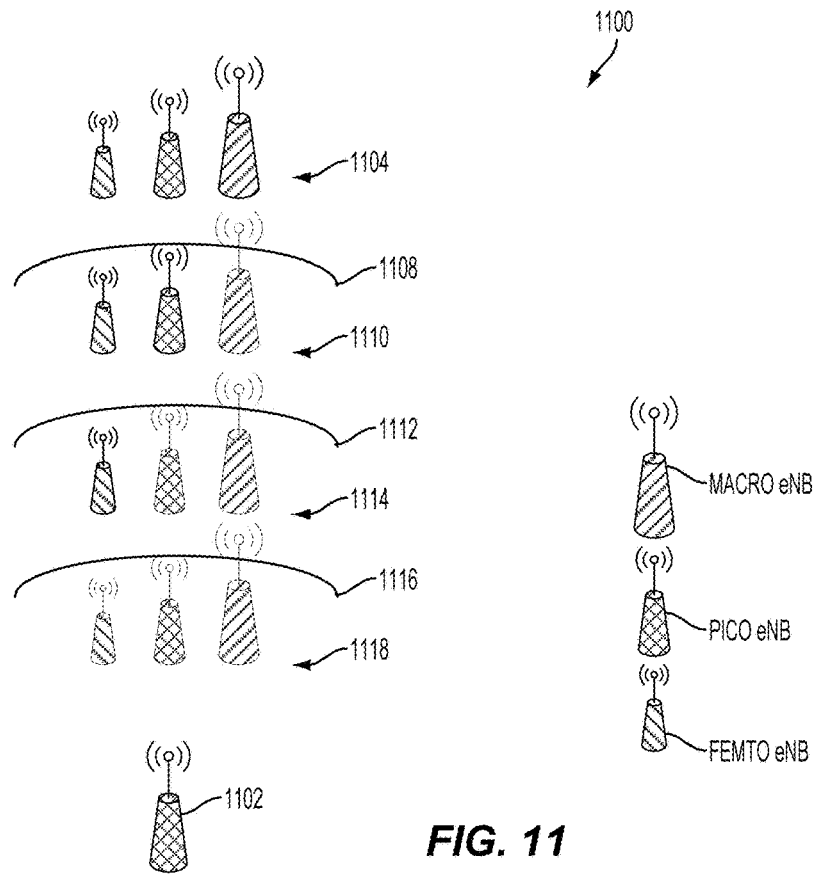
FIG. 11 is a schematic diagram showing an example of class-dependent exclusion zones based on transmitter class.

In some cases, different, partially overlapping exclusion zones may be defined for different device classes. An example of different device classes is shown in the TABLE 1000 of FIG. 10. Specifically, FIG. 10 shows various parameters that may be used to group base stations into different classes. An example of different exclusion zones 1100 is based on device class for a given primary receiver 1102 (FIG. 11). An innermost exclusion zone boundary 1116 excludes all classes 1118 of base stations. A second exclusion zone boundary 1112 outside of the innermost exclusion zone boundary 1116 excludes all classes of base stations except for femto eNodeBs 1114. A third exclusion zone boundary 1108 outside of the second exclusion zone boundary 1112 may exclude macro base stations only, allowing femto or pico eNodeBs 1110. Outside of the third exclusion zone boundary 1108, all classes 1104 of base stations are allowed.

It may be beneficial to define some device subclasses, such as, for example, different ranges of conducted power for macro base stations, outdoor/indoor pico base station, MIMO capability, number of Tx antennas, and/or coordinated multi-point (CoMP) joint transmission capability. Further subclasses may be defined as needed and agreed among system operators.

Exclusion Zones for UEs

In some cases, it may be difficult to enforce exclusion zones for UEs because it is not assumed that geolocation information is universally available for all UEs. In one configuration, a control method may assume that exclusion zones for UEs are handled via defining and/or extending exclusion zones for serving eNodeBs.

A relationship may exist between the eNodeB Tx power and the eNodeB coverage radius that defines the possible UE locations. The DL exclusion zone may be determined with some definable relationship to the UL exclusion zone. However, it cannot be assumed that the interference tolerated by the primary user on the UL frequency and on the DL frequency are related to each other in a predefined manner. Therefore, it may be desirable to extend the DL exclusion zone by a margin accounting for the desired interference protection from the UL frequency. Other reasons for extending the DL exclusion zone are provided elsewhere in this disclosure.

Exclusion Zones for TDD

In the case of TDD, it may be assumed that the interference tolerated by the primary user is the same for the UL as for the DL. However, an extension of the exclusion zone compared to a DL only case may be specified when the UE is near the edge of a coverage border so that the UE radiated transmit power is larger than the field strength of the received eNodeB power. Additionally, or alternatively, an extension of the exclusion zone compared to a DL only case may also be specified when a UE is beyond a specific distance from the coverage area and the received power from the eNodeB exceeds the received power from the UE. Additionally, or alternatively, an extension of the exclusion zone compared to a DL only case may also be specified when the location of the UEs is not known and the UEs may aggregate at the worst case edge of coverage from the perspective of interference caused to the primary user.

In general, extending the DL exclusion zone by a factor of two may suffice in the conventional deployment. Specifically, the factor is calculated based in part on the assumption that the UL cell throughput is typically not greater than the DL cell throughput.

Multi-Antenna Exclusion Zones

When multiple antennas transmit correlated signals, the signal will be constructively added in certain locations/directions. For example, in the DL MIMO case, the eNodeB may use beamforming. Beamforming can be used advantageously, where the eNodeB intentionally beamforms away from the protection zone. In the conventional network, beamforming may create a random fluctuation around the mean power with a worst case peak gain of $g_{MIMO}=10 \cdot \log_{10}(N_{Tx})$ where $N_{Tx}$ is the number of transmit antennas employed. $g_{MIMO}$ can be used as a backoff factor when converting protection zones to exclusion zones.

A similar effect occurs with enhanced multimedia broadcast multicast service (eMBMS) and/or DL CoMP. In these cases, multiple eNodeBs may transmit correlated data. Similar to the MIMO case, a worst case gain peak can be calculated as $g_{CoMP}=10 \cdot \log_{10}(N_{JT})$ where $N_{JT}$ is the number of eNodeBs cooperating in joint transmission or transmitting eMBMS data. However, the $g_{CoMP}$ value may be overly conservative because in an evolved CoMP scheme, the transmit powers are not evenly distributed among participating eNodeBs. Additionally, it is unlikely that the point where the received power from each participating eNodeB for either CoMP joint transmission or enhanced multimedia broadcast multicast service falls within the protection zone.

It should be noted that $g_{CoMP}=0$ for coordinated beamforming (CBF) CoMP schemes. Also, when CoMP and MIMO are used together, $g_{MIMO}$ and $g_{CoMP}$ are cumulative.

Protection Zones

Protection zones differ from exclusion zones in that instead of specifying an area within which certain device types cannot operate, a tolerable interference level is defined and the exclusion zone is calculated by the ASA controller or ASA network manager with the knowledge of deployed device classes and device densities. Protection zones may provide more flexibility for the secondary users while meeting the specified interference protection. Therefore, defining protection zones may provide improved use of the ASA spectrum. Protection zones can be defined, for example, with the attributes given in TABLE 4 below.

TABLE 4

| Protection zone attributes | |
|---|---|
| Protection zone parameter type | Protection zone parameter |
| Geographical area | Geographical area descriptor coordinates |
| Time | Start time |
| | Duration |
| Receiver assumption | Receiver antenna gain |
| | Receiver antenna orientation |
| | Receiver antenna height |

TABLE 4-continued

| Protection zone attributes | |
|---|---|
| Protection zone parameter type | Protection zone parameter |
| Received power | Lower endpoint of frequency interval
Upper endpoint of frequency interval
Received power limit within frequency interval |

Figure 12:
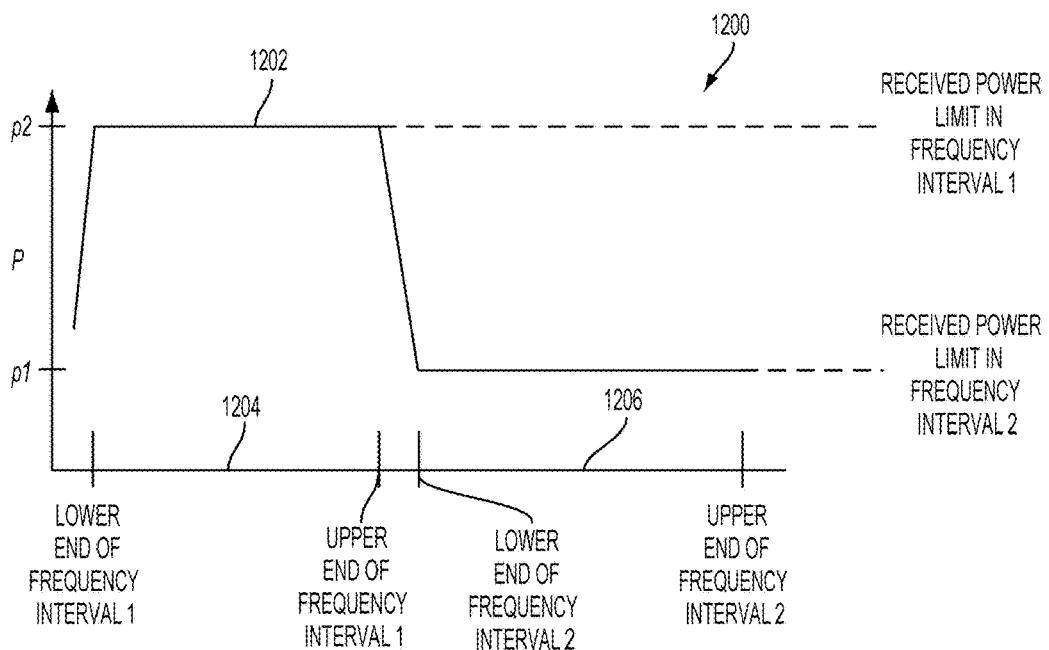
FIG. 12 is a frequency-power line diagram showing an example of protection zone limits.

As an example, protection zone received power limits can be set as shown in FIG. 12, illustrating a frequency-power (P) limit distribution 1200 according to a relationship 1202. A first frequency interval 1204 may correspond to the operating frequency of an ASA secondary user and may be assigned a received power limit p2. Furthermore, a second frequency interval 1206 may correspond to the operating frequency of an ASA primary user and may be assigned a limit of p1. A reason for defining received power limits for the operating frequency of an ASA secondary user may be that the devices used by the primary user may have finite adjacent channel selectivity (ACS) capability.

Figure 13:
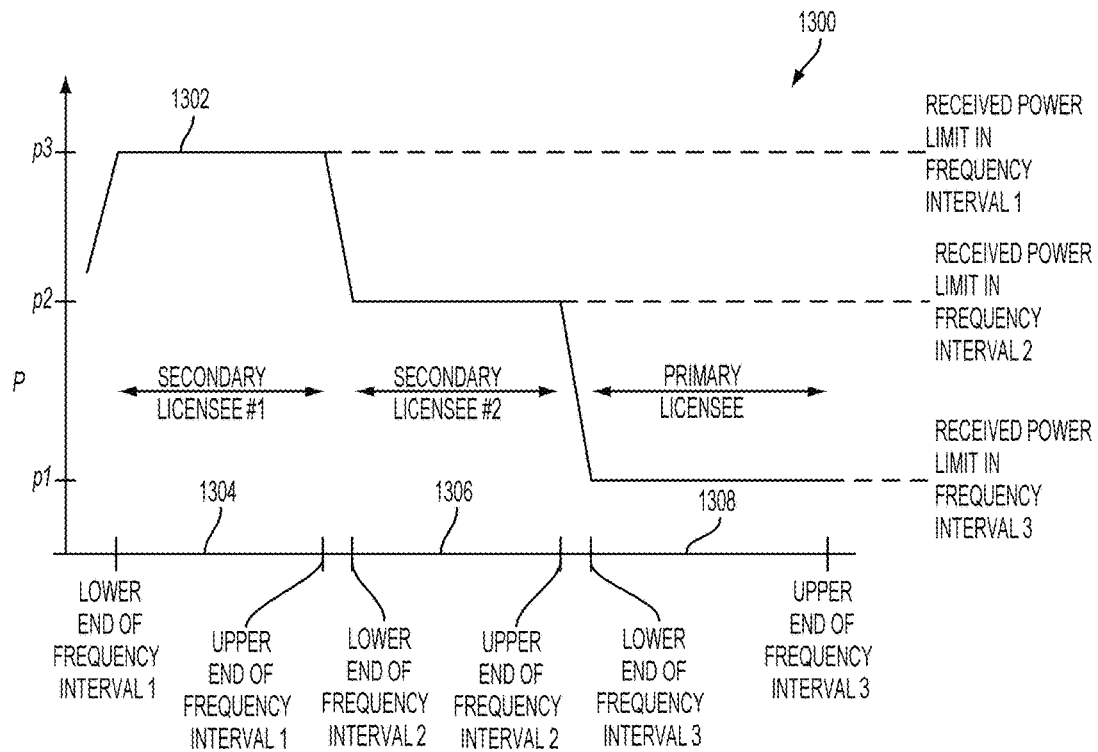
FIG. 13 is a frequency-power line diagram showing an example of protection zone limits for two secondary systems.

FIG. 13 illustrates an example of a distribution 1300 according to a network deployment. The network deployment assumes two secondary users, one in each first frequency interval 1304 and second frequency interval 1306, and a primary user is assumed in a third frequency interval 1308. A received power limit 1302 may be specified for different frequency intervals.

Figure 14:
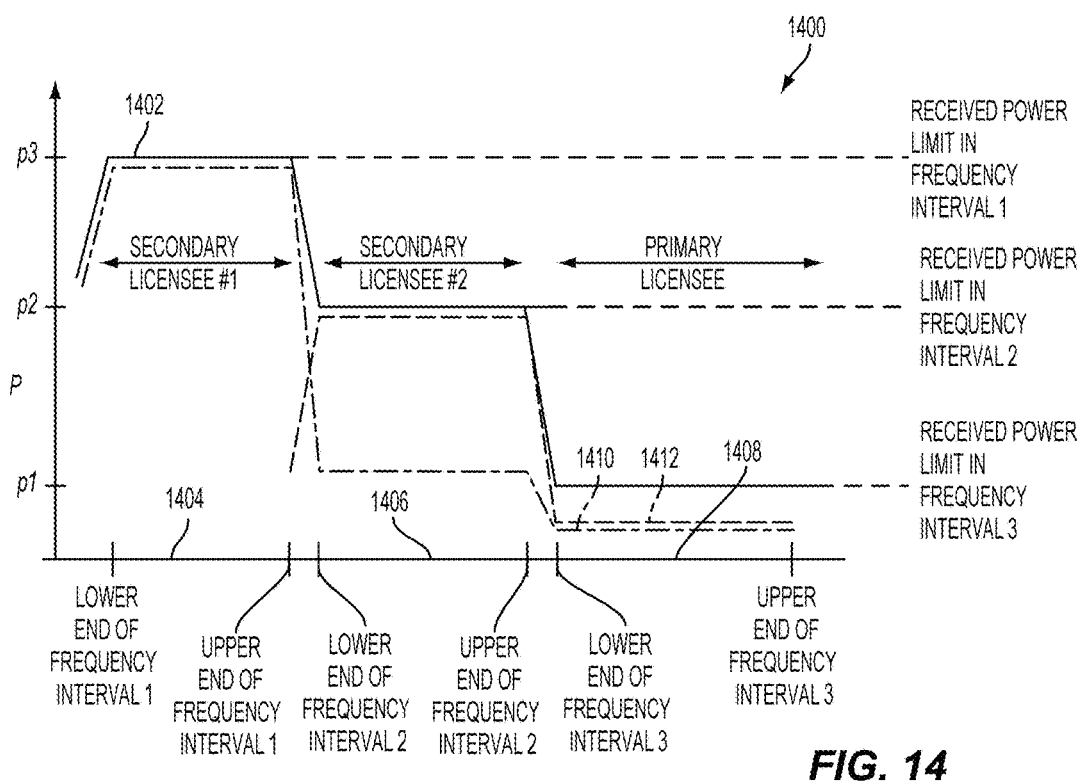
FIG. 14 is a frequency-power line diagram showing an example of partitioning interference related protection zone parameters for multiple secondary systems.

When more than one secondary user interacts with a primary user, the tolerable received power limits may have to be partitioned among the secondary users. An example of such partitioning is illustrated in diagram 1400 of FIG. 14, based on the protection zone arrangement given in FIG. 9. Again, two secondary users are assumed, one in each first frequency interval 1404 and second frequency interval 1406, and a primary user is assumed in a third frequency interval 1408. A received power limit 1410 to the first secondary user and received power limit 1412 to a second secondary user is also shown in FIG. 14. A received power limit 1402 may be specified for different frequency intervals. Note that the partitioning can be determined by the incumbent network controller or by the ASA controller.

Interference Partitioning Based on Geographical Area

Figure 15:
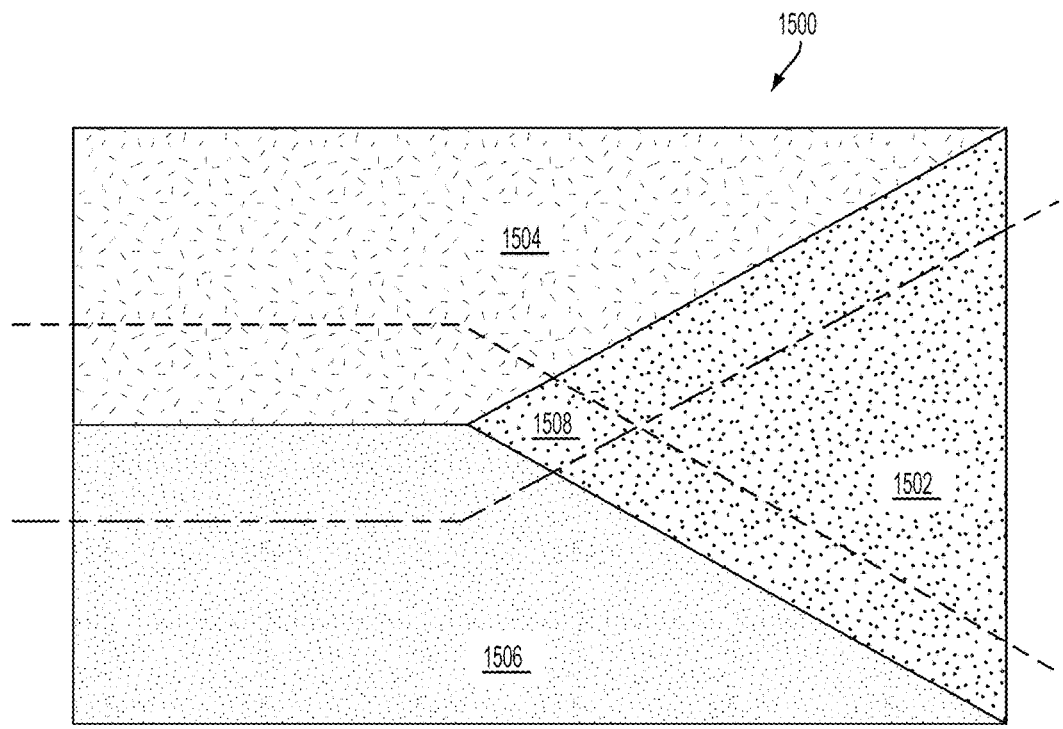
FIG. 15 is a map showing examples of protection zones with multiple boundaries.
Figure 16:
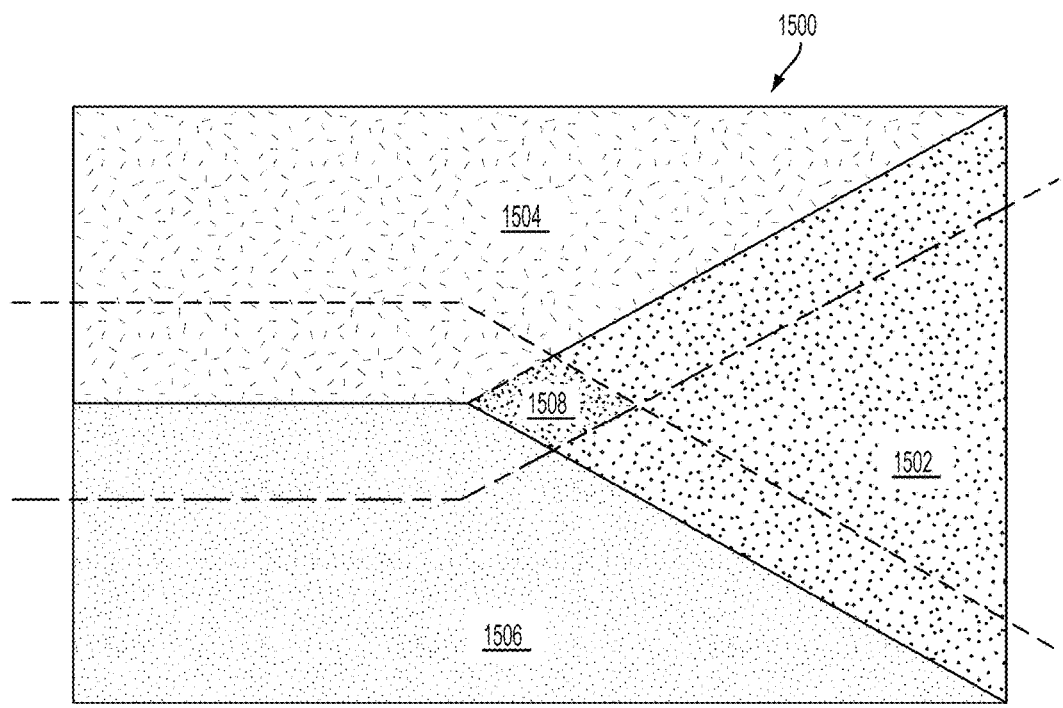
FIG. 16 is a map showing examples of geographical partitioning of protection zones.

In some cases, ASA secondary users are separated by geography. In these cases, protection zones with 3-way boundaries may occur. An example is shown in the adjoining zones 1500 of FIG. 15. As shown in FIG. 15, in a protection zone 1502 for the primary user, cumulative interference occurs in an area 1508 near both secondary zones 1504, 1506. To maintain the desired interference protection, the protection zone may be partitioned in the area of multiple boundaries. As shown in adjoining zones 1600 of FIG. 16, the cumulative interference area 1508 is designated as a second protection zone for the primary user. In the example of FIG. 16, the specified received power levels in the second protection area are less than the received power levels in the first protection area.

Protection Zones for TDD

The protection zone parameters are attributable to receivers, therefore, the source of the interference, such as whether the interference is caused by eNodeBs or UEs, is inconsequential. Therefore, the same protection zone description is applicable to both FDD and TDD.

Other ASA-1 Parameters

For the purposes of diagnosis and error handling, the primary user may send measured interference parameters over the ASA-1 interface to the ASA controller. Some of the interference parameters are listed in TABLE 5 below.

TABLE 5

| Interference parameter type | Interference parameter |
|---|---|
| Geographical area
Time | Geographical area descriptor coordinate(s)
Start time
Duration |
| Receiver assumption | Receiver antenna gain
Receiver antenna orientation (horizontal and tilt)
Receiver antenna height |
| Received interference | Lower endpoint of frequency interval
Upper endpoint of frequency interval
Received interference power within frequency interval |

Note that the format of parameters in TABLE 5 can be identical to those listed in TABLE 4.

Additionally, the primary user may explicitly measure signal sources operated by secondary users. The signal source parameters can be transmitted via the message formats described in TABLE 6 below.

TABLE 6

| Signal source parameter type | Signal source parameter |
|---|---|
| Physical cell ID | Cell ID of eNodeB or Cell ID used for UL SRS/DM-RS sequence generation by UE |
| Global cell ID | Cell ID of eNodeB |
| ASA ID | Special ASA identifier, if defined |
| Time | Start time
Duration |
| Operating frequency | Operating ASA band
Operating ASA channel |
| Received interference | Lower endpoint of frequency interval[1]
Upper endpoint of frequency interval[1]
Received interference power within frequency interval |

[1]Frequency interval may not correspond to fundamental transmission. It can correspond, for example, to out-of-band emissions if the signal source is identifiable.

Additionally, as optional functionality, the primary user may provide information on the expected interference caused by the primary user to the secondary user(s). The signal source parameters may be conveyed via message formats described in TABLE 7 below.

TABLE 7

| Signal source parameter type | Signal source parameter |
|---|---|
| ASA ID | Special ASA identifier of primary user, if defined |
| Geographical area | Geographical area descriptor coordinate(s) |
| Time | Start time
Duration |
| Operating frequency | Operating ASA band
Operating ASA channel |
| Receiver assumption | Receiver antenna gain
Receiver antenna orientation (horizontal and tilt)
Receiver antenna height |
| Caused interference | Lower endpoint of frequency interval[1]
Upper endpoint of frequency interval[1]
Caused interference power within frequency interval |

[1]Frequency interval may not correspond to fundamental transmission. It can correspond, for example, to out-of-band emissions.

ASA Controller Functions

The ASA controller should provide ASA parameter aggregation, ASA parameter partition, ASA parameter translation, ASA parameter concealment, a diagnostic function, an interference resolution function, and/or a service continuity function.

ASA Parameter Aggregation Function

An ASA controller may be coupled to multiple primary users and multiple secondary users. The latter has been shown in FIG. 4. The ASA controller can provide information to/from multiple entities. The aggregation function also provides routing. That is, the aggregation function provides a single addressable interface over which a primary user can interact with multiple secondary users.

Interference Partitioning Function

The partitioning described above may be performed because a single ASA controller can be connected to multiple secondary users. The interference partitioning is specified when considering the cumulative effect of interference caused by secondary users. Although the interference partitioning could be performed by the primary user, the ASA controller provides the functionality in a conventional system.

ASA Parameter Translation Function

As previously discussed, there may be various parameter formats used via the ASA-1 and ASA-2 interfaces and these parameters may have to be translated from one to another. In some cases, protection zone parameters are translated to exclusion zone parameters. The translation calculates, based on a priori channel models, transmitter parameters to determine the boundary area beyond which secondary user equipment is safe to operate without causing harmful interference. Furthermore, the translation of protections zones to exclusion zones uses an assumption of the primary user deployment density because the interference caused will be cumulative over all interfering transmitters.

Although the ASA parameter translation could be performed by the primary user, the translation is typically performed by the ASA controller because the ASA controller can serve as an aggregation point of secondary user network information. As an alternative, ASA parameter translation can also be performed by the secondary user. In this case, the parameter translation may directly map the protection zone parameters to the network planning by identifying the eNodeBs that may remain operational.

ASA Parameter Concealment Function

Data on a primary user's protection zone parameters may be privileged. Furthermore, the data's pattern in time may also be privileged. Therefore, the data may not be disclosed to ASA secondary users. In some cases, by conveying exclusion parameters over the ASA-2 interface, parameter concealment may occur. As further protection, the primary user or the ASA controller can further dither the usage data by extending the time and/or geographical area beyond a minimum specification.

In another configuration, information, such as deployment information and/or usage data of an ASA secondary user is not disclosed. In some cases, the disclosure to the primary user is accepted but there may be cases with multiple secondary users where disclosure to other secondary users is not accepted. By performing ASA parameter concealment and translation at the ASA controller, the data sharing among secondary users can be avoided.

Diagnostic Function

Some ASA functionality, such as parameter translation or interference partitioning uses knowledge of deployment data, transmitter parameters, and/or channel models. Still, adaptability is desirable. Furthermore, it may be desirable to have input assumptions pre-agreed and made unchangeable by the ASA controller. Even in this case, however, it is desirable to enable logging of operational parameters and achieved interference and/or interference protection levels for the purpose of monitoring and for enabling possible future enhancements.

The collection of diagnostic parameters can be through the interfaces ASA-1 and ASA-2 and can be augmented by interference measurements by the ASA controller. The latter may necessitate a network of interference sensors connected to the ASA controller.

Interference Resolution Function

It is possible that the primary user experiences an unacceptable level of interference and there is a desire to mitigate the interference. In some cases, the interference may be mitigated by increasing the exclusion zone and/or directing a secondary user to seize operation.

In the case of multiple secondary users, the licensee that causes the interference may not be determined. Thus, if a diagnostic function is available, it may be possible to turn on/off secondary users one-by-one and monitor the interference measurements provided by the primary user or the ASA controller to determine a course of action. If the time for determining the precise cause of interference does not fit the primary user's tolerance window then all secondary users might be directed to seize operation.

In another configuration, the primary user identifies the interference source and can correct the interference condition. This may be possible in some cases when the primary and secondary user both use the same air-interface, such as LTE.

Service Continuity Function

Due to the potential high sensitivity to error cases, the ASA controller should provide for reliable operation irrespective of various error scenarios. This functionality may be improved by specifying redundancy and self-monitoring.

In addition, fallback methods should be provided in cases of ASA-x interface outage. For example, a keep-alive message exchange can be used with a certain periodicity and when the message is not received, the ASA controller can default to a worse case interference protection scenario, for example, by directing all ASA secondary users to cease operation.

ASA-2 Interface

Examples for ASA-2 message types and ASA-2 parameters will be described below. It should be noted that some of these parameter structures could be reused for ASA-1.

For messaging direction a forward direction refers to messages sent from the ASA controller to the ASA network manager. The messages may be related to but not identical to push messaging. Additionally, a reverse direction refers to messages sent from the ASA network manager to the ASA controller. The messages may related to but not identical to pull messaging.

Interface Procedures and Messages

Figure 17:
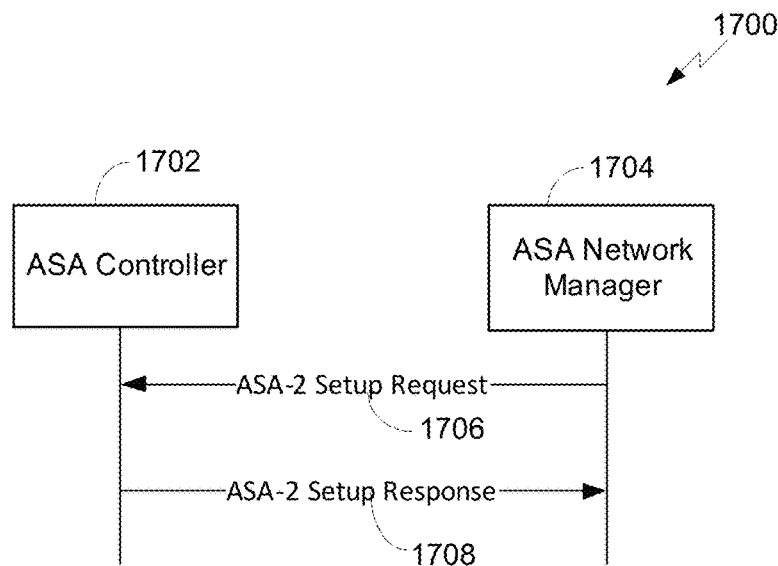
FIG. 17 is a sequence diagram showing an example of a setup procedure call flow for an ASA interface.

FIG. 17 illustrates a flow diagram for an ASA-2 setup procedure 1700 that may be initiated by the ASA network manager 1704 to setup an ASA-2 interface with the ASA controller 1702. The procedure involves the exchange of the identity and capability of the ASA-2 endpoints, using a setup request message sent at time 1706 to the ASA controller 1702 and a response message sent at time 1708 to the ASA network manager 1704.

Figure 18:
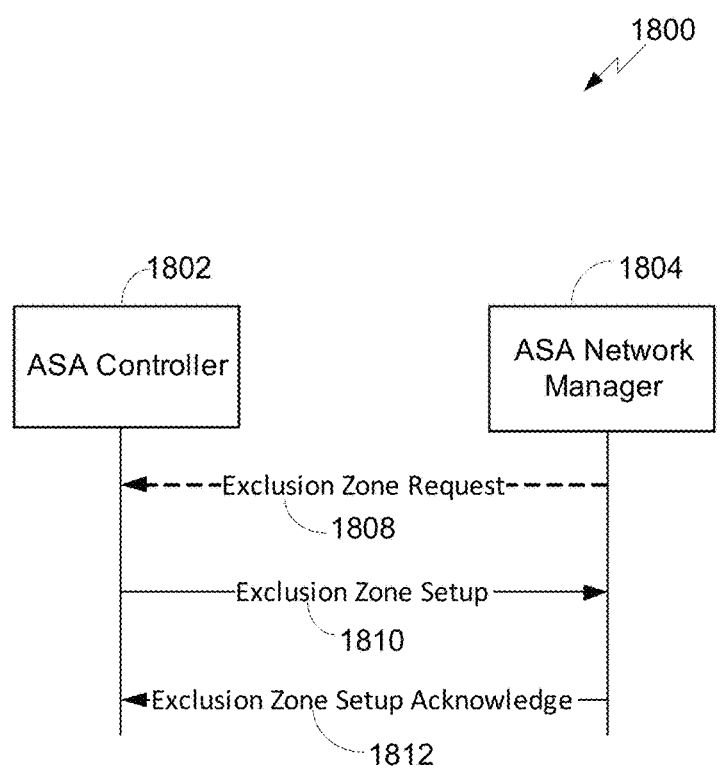
FIG. 18 is a sequence diagram showing an example of an exclusion zone management procedure call flow.

FIG. 18 illustrates a flow diagram for an exclusion zone management procedure 1800 that may be used to manage the exclusion zones configured at the ASA network manager

1804. The ASA controller 1802 may configure an exclusion zone at the ASA network manager 1804 at the time of startup or when the exclusion zone is modified. The procedure also permits the ASA network manager 1804 to query the ASA controller 1802 at time 1808 for updates to the exclusion zone (e.g., near the time of expiry of the current exclusion zone). The ASA controller 1802 responds with exclusion zone setup information at time 1810. The network manager may acknowledge the exclusion zone setup information at time 1812.

Figure 19:
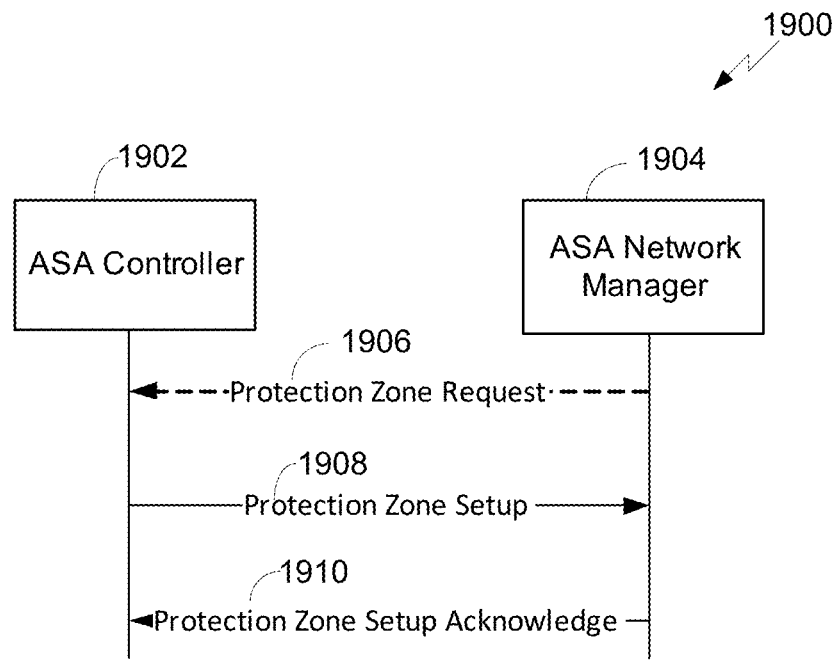
FIG. 19 is a sequence diagram showing an example of a protection zone management procedure call flow.

FIG. 19 illustrates a flow diagram for a protection zone management procedure 1900 that may be used to manage the protection zones configured at the ASA network manager 1904. The protection zone management procedure 1900 may be applicable if the interference calculations needed to satisfy the protection zone are carried out in the ASA network. In this configuration, the ASA controller 1902 configures a protection zone at the ASA network manager 1904 at the time of startup or when the protection zone is modified. Furthermore, the ASA network manager 1904 may query the ASA controller 1902 at time 1906 for updates to the protection zone. The query at time 1906 may be performed near the expiration time of the current protection zone. At time 1908, the ASA controller 1902 may provide a protection zone setup response message to the query of time 1906. The protection zone setup response message may be acknowledged by the ASA network manager 1904 at time 1910.

Figure 20:
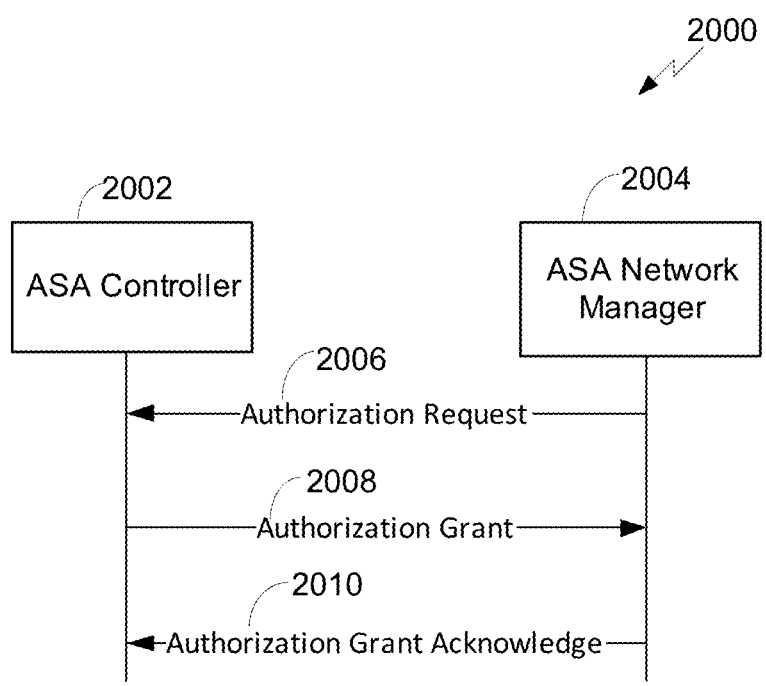
FIG. 20 is a sequence diagram showing an example of an authorization request procedure call flow.

FIG. 20 illustrates a flow diagram for an ASA authorization request procedure 2000 that may be used by the ASA network manager 2004 to request operation in specific locations or regions at time 2006. The ASA controller 2002 grants or denies the request, at time 2008, based on estimating the interference cause by operation at the specific location. The ASA network manager 2004 may acknowledge receiving the grant at time 2010. The ASA controller 2002 may also initiate the ASA authorization request procedure 2000 to inform the ASA network manager 2004 for updates to the decisions.

Figure 21:
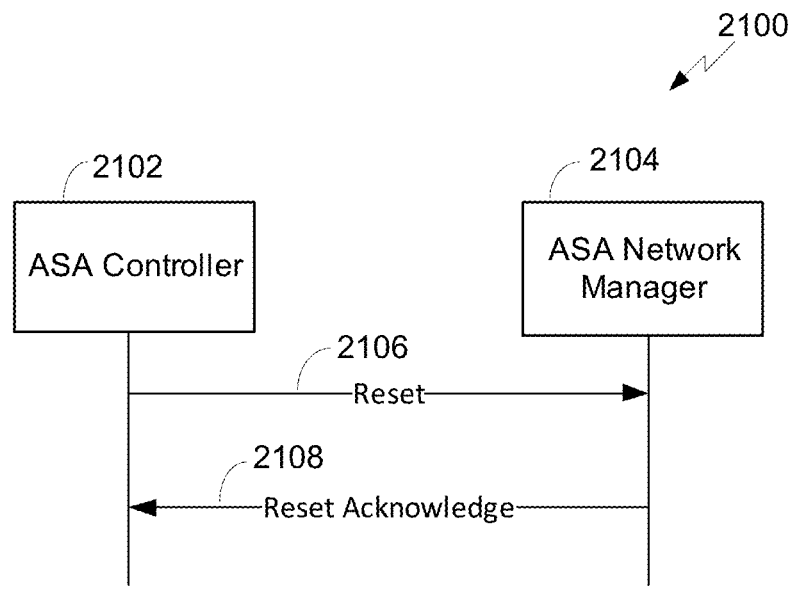
FIG. 21 is a sequence diagram showing an example of an ASA reset procedure call flow.

FIG. 21 illustrates a flow diagram for an ASA reset procedure 2100 that may be used by the ASA controller 2102 to stop the usage of ASA resources by the secondary user by sending a reset message at time 2106 to the ASA network manager 2104. The usage of ASA resources may be stopped completely, or at specific locations, time occasions, and/or ASA channels. The ASA network manager 2104 may respond at time 2108 with an acknowledgement message.

Figure 22:
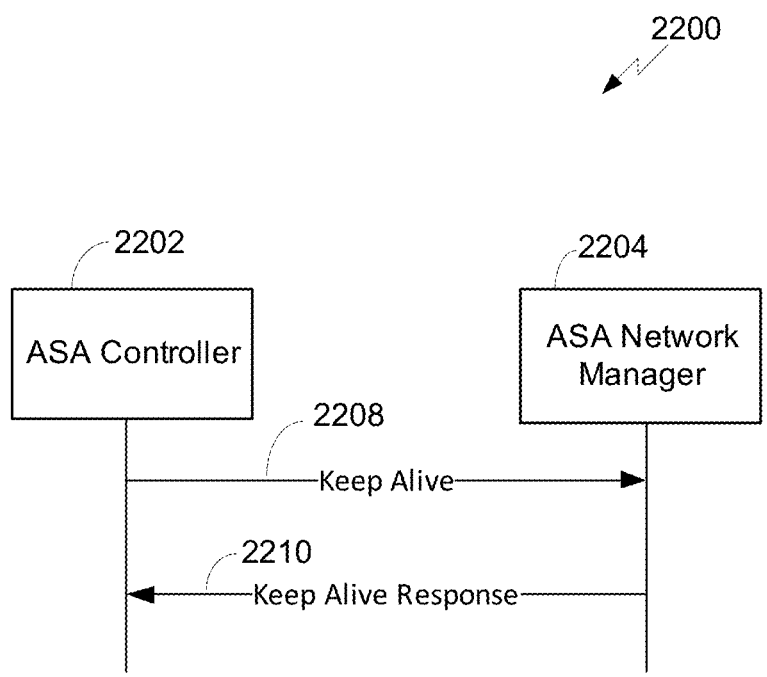
FIG. 22 is a sequence diagram showing an example of "keep alive" procedure call flow.

FIG. 22 illustrates a flow diagram for a keep alive procedure 2200 that may be used by the ASA controller 2202 to inform the ASA network manager 2204 about the connectivity status of the ASA-2 link. If the keep alive message transmitted at time 2208 is not received by the ASA network manager 2204 for a predetermined amount of time, the ASA network manager 2204 declares link failure and takes previously agreed actions, such as stopping the usage of all ASA resources. If the keep alive message transmitted at time 2208 is received, the ASA network manager 2204 may send an acknowledgement message at time 2210.

Figure 23:
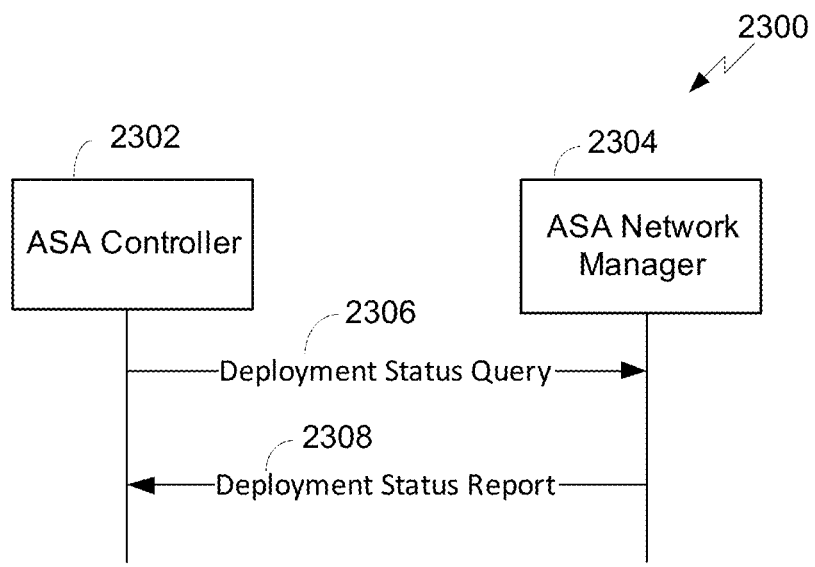
FIG. 23 is a sequence diagram showing an example of deployment status query procedure call flow.

FIG. 23 illustrates a flow diagram for an ASA network deployment status query procedure 2300 that may be used by the ASA controller 2302 to request deployment parameters at time 2306. The parameters may be node locations and/or transmit powers of the ASA network manager 2304 associated with the second user. The procedure may be used by the ASA controller 2302 to estimate the interference level in the protection zone and adjust the exclusion zone if needed. The ASA network manager 2304 may respond with a report message at time 2308 providing the requested information.

Figure 24:
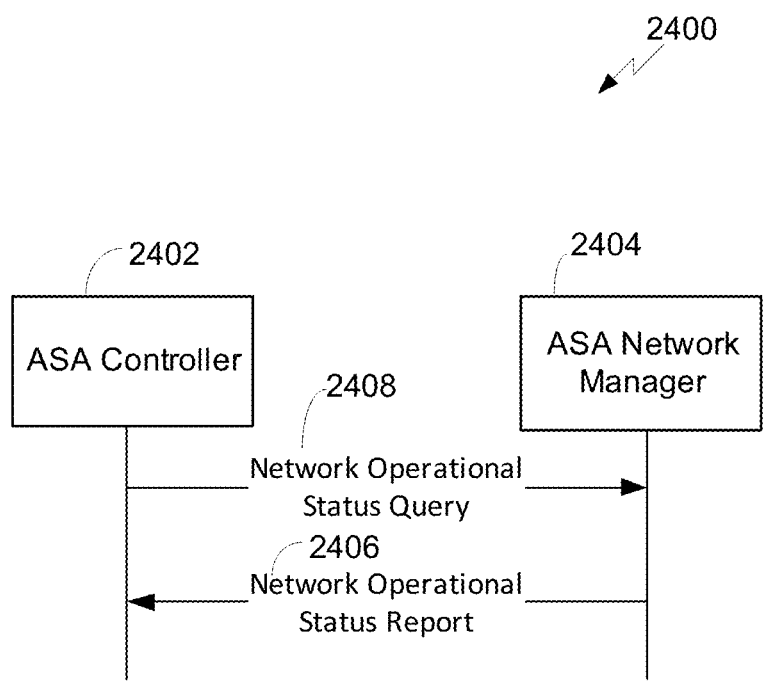
FIG. 24 is a sequence diagram showing an example of a network operational status query procedure call flow.

FIG. 24 illustrates a flow diagram for an ASA network operational status query procedure 2400 that may be used by the ASA controller 2402 to request operational parameters at time 2408, such as node loading, of the secondary network 2404. The ASA network operational status query procedure 2400 may be used by the ASA controller 2402 to improve the spectrum usage. The ASA network manager 2404 may respond with a status report message at time 2406 providing the requested information.

An ASA device operation status query is as a procedure that is a variation of the network operation operational status query. The ASA device operation status query queries the status of devices in the secondary network. For example, the device power levels and IDs can be queried.

The notice of violation procedure can be used by the ASA controller to inform the ASA network manager about occurrence of elevated interference levels in the protection zone. The message can be accompanied by an update to the exclusion zone.

The primary network operational status query may be initiated by the ASA network manager to query the primary user's activity and power levels to better plan the secondary network. The primary user's operational status query is optional.

Message Headers

Figure 25:
FIG. 25 is a TABLE showing examples of message headers for session management and error check routing.

Message information fields as described below may assist in session management and error check routing. Routing information is assumed to be included in IP headers. FIG. 25 shows a TABLE 2500 of message headers as examples in forward or reverse directions. For more evolved session control and management, various parameter subtypes can be added. Therefore the information fields described in FIG. 25 may be containers of multiple information elements.

Message Types

Various message types that can be used over the ASA-2 interface are described below. The messages used in the forward direction are given in the TABLE 2600 shown in FIG. 26 and the messages used in the reverse direction are given in the TABLE 2700 shown in FIG. 27.

For the purposes of message description, the parameter translation is performed by the ASA controller or the incumbent network controller. Therefore only exclusion zone parameters may be conveyed over the ASA-2 interface. For more evolved ASA control, various other messages can be added. Thus, the message types described in the TABLEs 2600 and 2700 are only examples.

Message Contents

Examples parameter content definitions for the various messages previously discussed are provided in the TABLE 8. Parameters may be arranged in parameter records, which may be used in multiple message types.

TABLE 8

| Record type | Contents/Description |
|---|---|
| Geographical area record | A geographical area is described as a union of one or more of the following<br>Index pointing to a predefined area descriptor<br>A geometrical shape described by<br>  Type (e.g., rectangle, circle, ellipse)<br>  Shape descriptor (e.g., center coordinates, size, orientation)<br>Polygon described by<br>  List of coordinates |

TABLE 8-continued

| Record type | Contents/Description |
|---|---|
| Time record | Time interval described as a union of one or more of the following<br>Index pointing to a predefined time period<br>Value reserved to indicate reference time (e.g., immediate action time)<br>Start time/date (e.g., unspecified duration or valid until revoked)<br>Explicit duration, defined as<br>Length of time interval, or<br>End time<br>Repetition period<br>Time lapse between start of repeated applicability periods<br>Number of repetitions<br>Other time description<br>E.g., calendar based |
| Network operation record | List of transmitters described by<br>Geographical coordinates<br>Lat/Long<br>Horizontal accuracy<br>Height<br>Vertical accuracy<br>eNodeB ID<br>Device class (e.g., macro, pico, femto)<br>Device subclass (e.g., indoor/outdoor, or other subclass) |
| Transmitter parameter record | For each transmitter, include operational parameters, such as<br>Conducted max output power<br>Antenna elevation (HAAT)<br>Antenna orientation/tilt<br>Antenna gain pattern<br>Index into a set of predefined patterns<br>MIMO capability<br>Number of antennas<br>Antenna array configuration (ULA, X-pol)<br>Average activity<br>Number of RBs used<br>Number of subframes used<br>Current activity<br>Number of RBs used<br>Number of subframes used |
| UE parameter record | For each transmitter, include operational parameters, such as<br>Conducted max output power<br>Antenna elevation (HAAT)<br>Antenna orientation/tilt<br>Antenna gain pattern<br>Index into a set of predefined patterns<br>Average activity<br>Number of RBs used<br>Number of subframes used<br>Current activity<br>Number of RBs used<br>Number of subframes used |

Some information elements (IEs), in particular those related to UE parameters, may not be used.

ASA-3 Interface

The messaging used over ASA-3 may reuse the definitions of the operations, administration and management (OAM) server and may be kept proprietary, as is the existing OAM. If the ASA network manager resides in the OAM server, the ASA-3 interface may not be separable from the regular OAM operation. This can be concluded with considering that the secondary user's eNodeBs already receive operational parameters from the OAM server as part of regular operation and that the eNodeB does not necessarily know the specific reason for a parameter assignment or parameter change. An additional feature that may not be available in existing OAM is the connection supervision, which may require a 'keep-alive' message as described elsewhere herein.

Simplified ASA Design

ASA-1 Interface

This section describes the messages that are sent over the ASA-1 interface in the simplified design. The content of each message is provided. For the simplified design, exclusion zones may be the only information conveyed over the ASA interfaces. Further description of exclusion zones is provided herein.

In the simplified design configuration, the protection zone to exclusion zone conversion is performed by the incumbent network controller and only exclusion zone parameters may be exchanged over the ASA interfaces. The incumbent network operator uses worst case assumptions regarding the ASA secondary users' deployment and/or uses information for the deployments that was conveyed outside of the ASA protocols.

Exclusion Zones (Simplified Design)

For the simplified design, the description of the exclusion zones may be the same as previously described for the general case. The description of excluded devices, (i.e., device classes) may be the same as previously described for the general case (TABLE 3). As a further simplification, it is assumed, for the simplified design, that device subclasses are not defined.

Exclusion Zones for UEs (Simplified Design)

Exclusion zones for UEs may be handled via defining and/or extending exclusion zones for serving eNodeBs. It may be desirable to extend the DL exclusion zone by a margin accounting for the specified interference protection from the UL frequency as previously described for the general case.

Exclusion Zones for TDD (Simplified Design)

For TDD, it can be assumed that the interference tolerated by the primary user is the same for the UL as for the DL. In general, extending the DL exclusion zone by a factor of two should suffice in the conventional system as previously discussed for the general case.

Protection Zones (Simplified Design)

Protection zones are not used in the simplified design.

ASA Controller Functions (Simplified Design)

The ASA controller should provide the following services, ASA parameter aggregation, ASA parameter partition, ASA parameter translation, ASA parameter concealment, and/or a service continuity function ASA Parameter Aggregation Function (Simplified Design)

A single ASA controller can be connected to multiple primary users and multiple secondary users. The latter has been shown in FIG. 4. The ASA controller can provide information to/from multiple entities. The aggregation function also provides routing in the sense that it provides a single addressable interface over which a primary user can interact with multiple secondary users.

Interference Partitioning Function (Simplified Design)

Interference partitioning may be specified because a single ASA controller may be connected to multiple secondary users. In contrast to the improved design, it is assumed that the partitioning performed by the ASA controller is not targeting the resolution of cumulative effect of interference caused by multiple secondary users. Rather, the partitioning may be only targeting the selection of relevant subset of exclusion zone parameters to be sent to each secondary user based on their deployment in geographical area and frequency.

ASA Parameter Translation Function (Simplified Design)

As previously discussed, various parameters formats may be used over the ASA-1 and ASA-2 interfaces and these parameters may have to be translated from one to the other. It should be noted that in contrast to the improved design, it is not assumed that the ASA controller performs any protection zone to exclusion zone parameter translation.

ASA Parameter Concealment Function (Simplified Design)

Data on a primary user's protection zone parameters and the data's pattern in time may be privileged and as such cannot be disclosed to ASA secondary users.

By parameter partitioning (i.e., by conveying a subset of the exclusion parameters over the ASA-2 interface to each of the secondary users) certain level of parameter concealment naturally occurs. As further protection, the primary user or the ASA controller can further dither the usage data by extending the time and/or geographical area beyond what would be minimally required.

Because there is no information exchanged for the network deployment of secondary users in the simplified design, ASA controller functionality is not specified to protect the secondary user's operational parameters form other secondary users or from the primary user.

Service Continuity Function (Simplified Design)

Due to the potential sensitivity to error, the ASA controller may provide reliable operation irrespective of various error scenarios. This functionality may be improved with adopting redundancy and self-monitoring.

In addition, fallback methods may be provided in cases of ASA-x interface outage. For example, a keep-alive message exchange can be used with a certain periodicity and when the message is not received. The ASA controller can default to a worse case interference protection scenario, for example, by directing all ASA secondary users to seize operation.

ASA-2 Interface (Simplified Design)

Examples for ASA-2 message types and ASA-2 parameters are provided below. It should be noted, that some of these parameter structures could be reused for ASA-1.

Messages Headers (Simplified Design)

The information fields used for session management and routing may be the same as previously described above for the general case.

Messages Types (Simplified Design)

In this section, various message types that can be used over the ASA-2 interface are described. For messaging direction forward direction refers to messages sent from the ASA controller to the ASA network manager. The messages are related to but not identical to push messaging. The reverse direction refers to messages sent from the ASA network manager to the ASA controller. The messages are related to but not identical to pull messaging.

The messages used in the forward direction are given in TABLE 2800 of FIG. 28 and the messages used in the reverse direction are given in TABLE 2900 of FIG. 29. As previously discussed, it may be assumed that only exclusion zone parameters are conveyed over the ASA-2 interface.

Message Contents (Simplified Design)

Provided below are example parameter content definitions for the various messages previously discussed. The various parameters are listed in the TABLE 9. It should be noted that parameters are arranged in parameter records, which can be used in multiple message types.

TABLE 9

| Record type | contents/Description |
| --- | --- |
| Geographical area record | A geographical area is described as a union of one or more of the following<br>Index pointing to a predefined area descriptor<br>A geometrical shape described by<br>Type (e.g., rectangle, circle, ellipse)<br>Shape descriptor (e.g., center coordinates, size, orientation) |

TABLE 9-continued

| Record type | contents/Description |
| --- | --- |
| | Polygon described by<br>List of coordinates |
| Time record | Time interval described as a union of one or more of the following<br>Index pointing to a predefined time period<br>Value reserved to indicate reference time (e.g., immediate action time)<br>Start time/date (e.g., unspecified duration or valid until revoked)<br>Explicit duration, defined as<br>Length of time interval, or<br>End time<br>Repetition period<br>Time lapse between start of repeated applicability periods<br>Number of repetitions<br>Other time description<br>E.g., calendar based |

In one configuration, it may suffice to use only a subset of the information elements given in TABLE 9.

ASA-3 Interface (Simplified Design)

The messaging used over ASA-3 may reuse the definitions of OAM and may be kept proprietary as is the existing OAM. If the ASA network manager resides in the OAM server, the ASA-3 interface may not be separable from the regular OAM operation. This can be concluded with considering that the secondary user's eNodeBs already receive operational parameters from the OAM server as part of regular operation and that the eNodeB does not necessarily know the specific reason for a parameter assignment or parameter change. An additional feature, not necessarily available in existing OAM, is the connection supervision, which may require a keep-alive message as described herein.

Procedures for Vacating ASA Spectrum

Overall Message Flow

Figure 30:
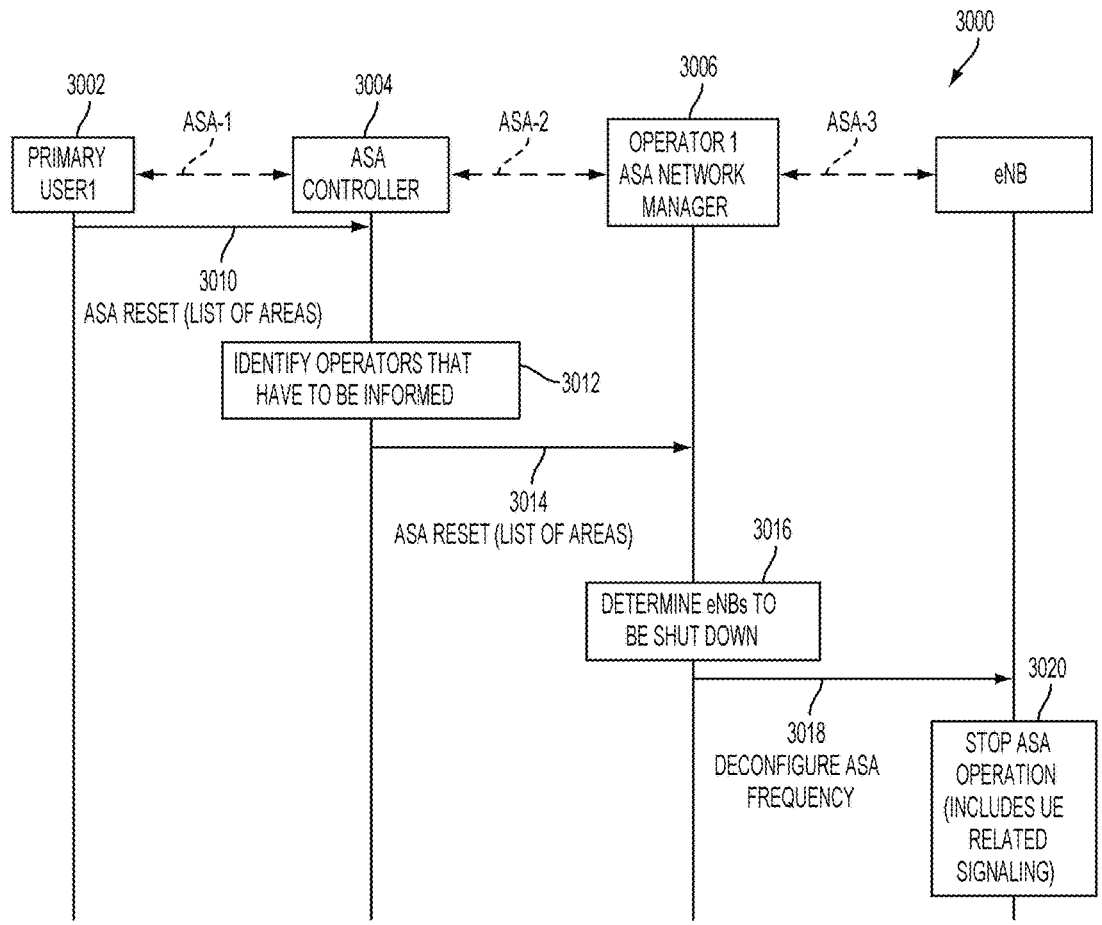
FIG. 30 is a sequence diagram showing an example of a call flow for a procedure vacating an ASA spectrum.

The procedure for vacating the ASA spectrum is initiated by the primary user and propagates over ASA-1 and ASA-2 protocols to reach the secondary network. FIG. 30 illustrates a message flow 3000 for vacating an ASA spectrum. Initially, a primary user 3002 requests an ASA reset at time 3010, which may include a list of areas affected by the reset. In case of multiple secondary networks, the ASA controller 3004 informs the affected networks. Further, if a particular area of a secondary network needs to be vacated, then the ASA controller computes the area that needs to be vacated at time 3012. The ASA controller then sends a message at time 3014 to each ASA network manager 3006 informing the areas in which the spectrum is to be vacated.

The ASA network manager 3006 determines, at time 3016, the set of eNodeBs 3008 that have to vacate ASA spectrum and sends messages, at time 3018, to the set of eNodeBs 3008 over the ASA-3 protocol. Each eNodeB 3008 stops its use of the ASA spectrum, at time 3020, and shifts traffic to other available spectrum.

In some cases a sudden stoppage of numerous eNodeBs presents scalability concerns on the ASA-3 protocol. If this scalability is an issue, the message to shut down the eNodeB may be delivered via mobility management entity (MME). The S1 interface is designed to simultaneously send messages to eNodeBs, for example, during emergency broadcast of earthquake warnings.

Actions at Secondary Network

When the secondary user receives a notice, either immediate or in advance, to vacate a particular ASA channel, the DL bandwidth may change, the UL bandwidth may change, both DL and UL bandwidth may change, the DL frequency may change, the UL frequency may change, both DL and UL frequency may change, and/or the ASA operation terminates.

As discussed above, the ASA operation may terminate. However, some of the procedures discussed can also be applied to the other cases. As part of vacating the spectrum, the UEs are handed over to another frequency, which can be a channel licensed to the operator in another band. The handover may be specified if the reason for leaving ASA is the UL interference or because of the need to maintain call continuity while there is a loss of ASA DL.

In some cases, the idle mode operation may only be supported in the licensed frequency, due to, for example, a scenario where multiple secondary users share the same ASA channel. In this case, the eNodeB sends a mobility control message indicating handover to every connected UE in the ASA frequency. Since there is no radio resource management (RRM) measurement involved, the incurred delay is only the radio resource control (RRC) procedure delay. This delay may have to be extended by a multiple of the discontinuous reception (DRX) cycle used for DRX UEs, also accounting for some downlink control channel decoding errors. It should be noted that some DRX UEs may be left behind. That is, the eNodeB may power down before being able to notify these UEs. Because these UE would not be able to transmit after detecting the DL CRS loss, the impact may be only some service interruption but not unexpected interference to the primary user.

When idle mode is supported in ASA, in addition to handing over all connected mode UEs, the idle mode UEs are also redirected to a licensed frequency. The redirection may be performed by paging UEs with a system information change notification. The delay incurred will depend on the paging cycle used, the system information change notification period, and/or the rate of missed pages. Still, some UEs that are left behind would not cause undue interference, therefore the delay in compliance with the vacate request may not be specified for a worst case scenario.

For a DL frequency change within the ASA channel, assuming that both the eNodeB and served UEs are changing frequency, there may be a conflict if the eNodeB cannot simultaneously operate on both the source and target frequencies. However, such configuration changes should already be handled by the existing Rel-8 system information change procedures. Alternatively, the conflict could be resolved with a two step handover such as a handover from an ASA channel A to a licensed channel to an ASA channel B.

Messaging Protocols Used Over ASA-1

The ASA-1 protocol may not be specified, since it may be a proprietary implementation based on the specific requirements of a given primary user. In some cases, the ASA-1 protocol may use a secure channel designed with possible redundancies to improve reliability. In addition, keep alive message exchange can be defined to enable detecting loss of connection. Upon loss of connection, the ASA controller can take action according to the description provided elsewhere herein.

Messaging Protocols Used Over ASA-2

The protocols over the ASA-2 interface may be standardized to allow multi-vendor solutions with the ability to swap out one vendor's node with a different node. The protocol may run over a secure connection, as described in connection with security below.

Messaging Protocols Used Over ASA-3

As previously discussed, the protocol used of ASA-3 is expected to reuse the definitions of OAM. If the ASA network manager resides in the OAM server, the ASA-3 interface is not separable form the regular OAM operation; therefore, there may not be a need to define a new ASA-3 protocol.

Additionally, a keep-alive message exchange may be used with a certain periodicity between the OAM server and the eNodeB. Furthermore, when the message is not received by the eNodeB, an ASA-3 connection loss is declared resulting in the eNodeB redirecting all served UEs to a different frequency and powering off in the ASA channel.

Security Specifications

The security specified for the ASA-1 interface is described below. For authentication, the primary user should be able to verify that it is connecting to the correct ASA Controller. Furthermore, the ASA Controller should be able to verify that it is connecting to the correct Primary user For message protection, the messages on ASA-1 interface should be ciphered, (i.e., may be decipherable by only the end-points of the ASA-1 interface). Additionally, the messages on ASA-2 interface should be tamper-resistant (i.e., any tampering should be detectable by the ASA-1 interface endpoints). Actions upon detection of tampering are not specified.

Protection against denial of service is desirable and can be promoted by using unpublished addresses. Moreover, the security functions are not specified to guarantee that operational parameters for a certain region may be only accessed by the operator authorized for that region. This function is assumed to be handled by ASA controller messaging logic.

The requirements on the ASA-2 interface are same as that on ASA-1 interface.

Certificate Based Security Overview

Certificate based security can provide end-to-end authentication and message protection between two peer nodes using public and private keys. Each node has a private key that may be known only to itself and a public key that is known globally. Further, a certificate authority can verify to node A that a certain public key indeed belongs to node B.

Once the above key infrastructure is specified, protocols such as TLS can be used to authenticate the peer nodes to each other also provide message protection. TLS uses the public/private keys to negotiate session keys that are then used for encryption/authentication of individual messages. This is desirable because the use of public/private keys for individual messages is computationally complex.

Support for TLS is used in various devices, from smartphones to mainframes. Further, TLS is considered a secure protocol as evidenced by its industrial use, such as use in banking transactions.

Certificate based security use a certificate authority. In some cases, public keys are installed at the peer nodes and the keys are stored within a tamperproof region of device memory. Alternatively, standardized protocols (e.g., X.509) to electronically install and update certificates may also be used. The standardized protocols use a hierarchy of trust where a trusted server can update certificates for other nodes.

Security for ASA Protocols

Certificate based security with TLS is an option for ASA-1 and ASA-2 protocols. Given the reduced number of nodes participating in message exchange, manual installation of certificates is feasible. The primary users' certificate may need to be installed only at the ASA controller and not in the operator network. Security may be improved by periodically changing the certificates, with each update being accompanied by a manual certificate installation.

Verification of Authorized Shared Access Operation

A primary user, such as a system of a national defense organization, may grant network resources to a secondary user, such as a mobile network operator (MNO). It should be noted that granting network resources refers to the network providing notice to the secondary user that such network resources are available. The network resources may be unused portions of a spectrum and/or frequency band. The granting of the network resources to the mobile network operator may be temporary, such that the licensed network resources may eventually revert to the primary user. The granted network resources may revert based on a request by the primary user or after a predetermined time.

The mobile network operator may have access to an unused portion of the spectrum based on the mobile network operator's location and/or time of use. For example, the network resources may only be available to the mobile network operator at a specific period of the day or when the mobile network operator is operating within a specific area. The time and location features may vary according to a network resource license arrangement. The license arrangement may allow for portions of the spectrum to be shared between the primary user and the mobile network operator.

To facilitate sharing of the network resources, spectrum licensing, such as authorized shared access, may be specified for the network. For a shared access system, it is desirable to predict the interference levels that may be experienced by a primary user when a mobile network operator is using a same band as the primary user in a coverage area that is adjacent to the coverage area of the incumbent user or within the same coverage area as the primary user. In one configuration, information of the primary user's operation on the shared spectrum is provided to an authorized shared access controller. The information may include time-varying specifications of the primary user. An authorized shared access system may specify configurations for operation of the primary user and the mobile network operator based on the information provided by the primary user. The configurations may be specified to mitigate interference.

The authorized shared access controller may use the information provided by the primary user to determine resource grants, such as frequency band grants, for the mobile network operator. Further, the authorized shared access controller may specify whether a base station/eNodeB of the mobile network operator may communicate in a particular frequency band of the shared spectrum. The authorized shared access controller may also specify a power level (e.g., maximum power level) that the mobile network may transmit in the particular frequency band.

Conventional authorized shared access systems may be inadequate for predicting interference levels caused by the wireless device to the primary user. That is, a conventional authorized shared access system may incorrectly predict interference levels experienced by the primary user when the wireless device is in an area that is adjacent to the primary user and communicating in a same frequency band as the primary user. Furthermore, conventional authorized shared access system may incorrectly predict interference levels experienced by the primary user when the wireless device is in a same area as the primary user and communicating on a frequency band that is adjacent to the primary user. The predictions of the interference levels may be implemented at the authorized shared access controller.

Conventional authorized shared access systems validate configurations of the authorized shared access system by implementing a performance monitoring system in the network of the primary user that provides a trigger to the authorized shared access controller to facilitate validation of the interference levels. That is, in the conventional system, the primary user may be used as a sensor to sense and report actual interference levels to the authorized shared access controller. However, the conventional validation system may not be desirable due to a lack of an organized management system. Therefore, it is desirable to improve the validation of the interference levels experienced at the primary user.

In some cases, the interference level predictions are achieved by a spectrum analysis implementation, coverage prediction implementation, and/or other implementations for predicting interference. In some prediction implementations, such as the coverage prediction implementation, the prediction may be compromised due to lack of an adequate propagation prediction tool. Furthermore, configuration changes by mobile networks may be unavailable to the authorized shared access controller or may not be up-to-date. The configuration changes at the wireless device may include changes to receiver/antenna orientation (e.g., horizontal and tilt) that change the propagation of a signal, changes to radiation pattern (e.g., tilt, vertical or horizontal beam width) and changes to other interference related parameters discussed above. In some cases, the accuracy of the prediction at the authorized shared access controller may be compromised because the authorized shared access controller is unaware of the current configurations of the wireless device.

The interference level predictions may be improved if the interference level is predicted by the mobile network operator. In this case, the authorized shared access controller informs the mobile network operator of the areas and frequencies to be protected in addition to interference thresholds to be observed. Still, in this case, the mobile network operator does not perform interference predictions. Nonetheless, the accuracy of the operator predictions may be dependent on the accuracy of propagation models. The propagation models may not be reliable because drive tests and manual changes may be specified in the optimization of real networks. In another configuration, the operations, administration and management center provides the authorized shared access controller with the results of the interference predictions.

The prediction accuracy may also be compromised by a wireless device that adapts its parameters to improve a set of criteria and or performance, such as quality of service or handover success rate. Although the wireless device has access to the changed parameters, providing the changes to a third party controller, such as the authorized shared access controller may reduce performance of the authorized shared access system. In addition, the authorized shared access controller may re-compute the predictions on a continuing basis, which may be computationally difficult and/or increase the overall system load.

In one configuration, based on an implementation at the primary user and/or based on a prediction implementation at the authorized shared access system or the mobile network operator's management system, the configurations of the authorized shared access system are validated before the primary user operates in the frequency band. Still, it may be desirable to improve the validation of configurations implemented by the authorized shared access system. For example, it is desirable to validate whether the level of interference experienced by the primary user is within a threshold across an area of operation of the primary user.

The level of interference is the level of interference that will be experienced by the primary user when the spectrum is shared or the level of interference that is currently experienced by the primary user.

According to an aspect of the present disclosure, configurations used by the authorized shared access system are validated (i.e., verified) based on measurements made from the use of the network by a wireless device of the mobile network operator. That is, a wireless device, such as a base station and/or UE associated with the mobile network operator may collect data, such as communication parameters, so that the authorized shared access system may validate the specified configurations. The wireless device may be operating within or near an exclusion zone associated with the primary user. Additionally, the wireless device is operating in the frequency band that is different from the frequency band of the shared spectrum. Still, the wireless device may have previously been operating in the frequency band of the shared spectrum. It should be noted that the wireless device refers to a wireless device of a mobile network operator that has been granted a license to share the spectrum/frequency with a primary user.

In one configuration, the wireless device may perform measurements, such as interference measurements, and the measurements are transmitted to the authorized shared access controller. The authorized shared access controller may use the measurements to validate the interference levels experienced by the primary user. Additionally, the authorized shared access controller informs the primary user of the validation. The primary user may initiate operation in the frequency of the shared spectrum after validation.

In one configuration, the authorized shared access controller adjusts an exclusion zone and/or a maximum power specified for mobile network communication based on the results of the validation. For example, the authorized shared access controller may increase the exclusion zone of the primary user or reduce the maximum power allowed for the mobile network communication if the results of the validation indicate that the interference experienced by the primary user is above a threshold. As another example, the authorized shared access controller may decrease the exclusion zone of the primary user or increase the maximum power allowed for the wireless device communication if the results of the validation indicate that the interference experienced by the primary user is below a threshold. It should be noted that in one configuration, the interference is validated after an initial correspondence with the wireless device and prior to the operation of the incumbent user.

In this configuration, the authorized shared access system operates as a control loop to adjust the exclusion zone and/or the maximum power based on the validated interference levels. In another configuration, the authorized shared access controller determines whether a base station can operate in the frequency band of the shared spectrum based on the location of the base station.

In another configuration, the mobile network operator's operations, administration and management (OAM) center adjusts the network deployment based on the results of validation. For example, the operations, administration and management center may direct particular base stations to stop transmitting in certain frequencies and/or reduce their maximum power if the results of the validation indicate that the interference experienced by the primary user is above a threshold. As another example, the operations, administration and management center may direct particular base stations to start transmitting in certain frequencies and/or increase their maximum power if the results of the validation indicate that the interference experienced by the primary user is below a threshold. It should be noted that in one configuration, the interference is validated after an initial correspondence with the wireless device and prior to the operation of the incumbent user. In another configuration, the operations, administration and management center provides the authorized shared access controller with the results of its interference predictions and measurements received after network adjustments.

As an example, a wireless device operating at a carrier frequency (F0), such as an LTE carrier frequency, or any other frequency without restriction, receives an indication to vacate the carrier frequency within a given area. Additionally, or alternatively, the wireless device may receive an indication that the primary user will use or is expected to use the frequency band of the shared spectrum in the exclusion zone. The notice may be initiated by the primary user and may be sent to a network controller of the wireless device via the authorized shared access controller. Upon receipt of the notice, the wireless device may comply with the notice to vacate operations on the carrier frequency.

In addition to the reception of the notice to vacate the carrier frequency, the wireless device may be requested to report measurements of communication parameters. The request for these measurements may be initiated by the authorized shared access controller. In one configuration, the request for measurement reports is transmitted in response to receiving the notice indicating that the primary user will use or is expected to use the frequency band in the exclusion zone. As previously discussed, the measurements may be performed at the wireless device and reported to the authorized shared access controller.

In another configuration the measurements reports are transmitted to the wireless devices that have been identified for power reduction or powering off. That is, the measurement reports may be transmitted to a wireless device that is causing interference prior to transmitting the measurement report to the network controller and/or the operations, administration and management domain. In this configuration, the devices sending the measurement reports are registered with a mobile network that is the same as the mobile network that adjusts the configuration for the wireless devices operating on the ASA spectrum. Alternatively, the devices sending the measurement reports may be registered with a mobile network that is different from the mobile network that adjusts the configuration for the wireless devices operating on the ASA spectrum The measurements may include received levels of power, such as received total wideband power (RTWP), in the carrier frequency for wireless devices, such as eNodeBs and/or UEs that operate in the given area. Additionally, in one configuration, the measurements also include measurements from wireless devices that operate on a frequency that is different from the carrier frequency. The measurements may also include inter-frequency measurements of the carrier frequency by one or more wireless devices. The request to report measurements may be sent by the authorized shared access controller to a network controller of the wireless device. In one configuration, the request to report measurements is sent to the base stations via the network controller. Additionally, or alternatively, the request for measurements may be sent to the UEs associated with one or more base stations of the mobile network operator.

Measurement report(s) representing measurements at the wireless device may be collected and/or processed at the authorized shared access controller. In one configuration, each measurement report indicates characteristics of a wireless device. Furthermore, the measurement reports for a base station may include geographical area/location of the base station, height of the base station, antenna gain, cell bearing, and/or other parameters of the base station. Additionally, the measurement reports for a UE may include an estimated indication of the location of the UE.

The estimated location of the UE may be based on measurement of the location of the base station, cell bearing, and/or estimated radius of a cell of the base station. In one configuration, the measurement reports identify one or more dominant base stations based on an analysis and/or correlation with known pilots, reference symbols, and/or other metrics. The measurement reports may also be used to identify specific base stations to be turned off or to identify a base station with a power level that is greater than a threshold.

The measurement reports may be used to validate that the base stations in a specific area operate on a frequency that is different from the carrier frequency in compliance with the notice to vacate operations on the carrier frequency. By receiving data, such as the measurement reports, which indicate the improved interference levels, the authorized shared access controller can compile data for the improved interference levels without prior knowledge of the wireless device or without reliance on prediction implementations. Still, the results of the prediction implementations may be used to determine initial values of the data.

In one configuration, the authorized shared access controller notifies the primary user that it can operate in the carrier frequency based on the received measurement reports from the mobile network. The authorized shared access controller may determine whether the protection and/or exclusion zone of the incumbent network are greater than or less than a threshold based on the received report. That is, the protection may be less than a threshold and deemed insufficient. Moreover, the protection may be greater than a threshold and deemed excessive.

For example, as previously discussed, the authorized shared access controller may increase or cause the protection and/or exclusion zone to be increased and/or reduce the maximum power allowed for mobile network communication when the protection and/or exclusion zone is insufficient. The maximum power may refer to the power levels, such as transmit power levels, at the base stations. As another example, the authorized shared access controller may reduce the protection and/or exclusion zone and/or increase the maximum power allowed for wireless device when the authorized shared access controller determines that the protection and/or exclusion zone is excessive. The protection and/or exclusion zone may be increased or decreased based on a stepwise implementation.

In another example, the operations, administration and management center may directly command certain base stations to stop transmitting in specific frequencies or to transmit at a lower power. As another example, the operations, administration and management center may command certain base stations to start transmitting in specific frequencies or to transmit at higher power. The operations, administration and management center may communicate its actions to the authorized shared access controller. In another example, the operations, administration and management center may communicate the resulting calculated or measured interference to the authorized shared access controller.

In one configuration, the authorized shared access controller adjusts the exclusion zone or the maximum power level based on configuration adjustment information that is independent of the measurement reports. The configuration adjustment information may be received by the authorized shared access controller and may be independent such that features of the configuration adjustment information do not map to features of the received measurement reports. For example, the configuration adjustment information includes received power by an omnidirectional antenna at a specific height indicating that the height should be below a predetermined height.

In another configuration, the measurement reports are mapped to the configuration adjustment information. The mapping may be specified by processing the measurement reports to map to the requirements of the configuration adjustment information. Furthermore, the measurements reports may be filtered in addition to the processing when it is determined that the measurement reports cannot be mapped to the configuration adjustment information.

In one configuration, the authorized shared access controller validates the configurations based on an activity, such as a training activity, that is independent of the reception of the notice indicating that the carrier frequency should not be used by the mobile network. The training activity may be implemented offline such that the training activity may be independent of the notice to vacate. Alternatively, the training activity may be implemented online, such that the training activity may be in conjunction with the reception of the notice to vacate.

For example, the training activity may be implemented offline if it is known that certain operation areas are often requested by the primary user, and/or when it is known that changes to the parameters of the network is slow due to the self-organized network actions or otherwise. Accordingly, the operation of the primary user in the carrier frequency is initiated after receiving a validation from the authorized shared access controller that the interference levels experienced by the primary user are equal to or below a threshold.

In another example, the primary user notifies the authorized shared access controller of particular operational configurations that may be requested in the future and the authorized shared access controller initiates separate training activities for each configuration. The configurations may be indexed and the authorized shared access controller may associate the index with the specific actions that have been shown to provide the specified level of interference following training and validation.

Figure 31:
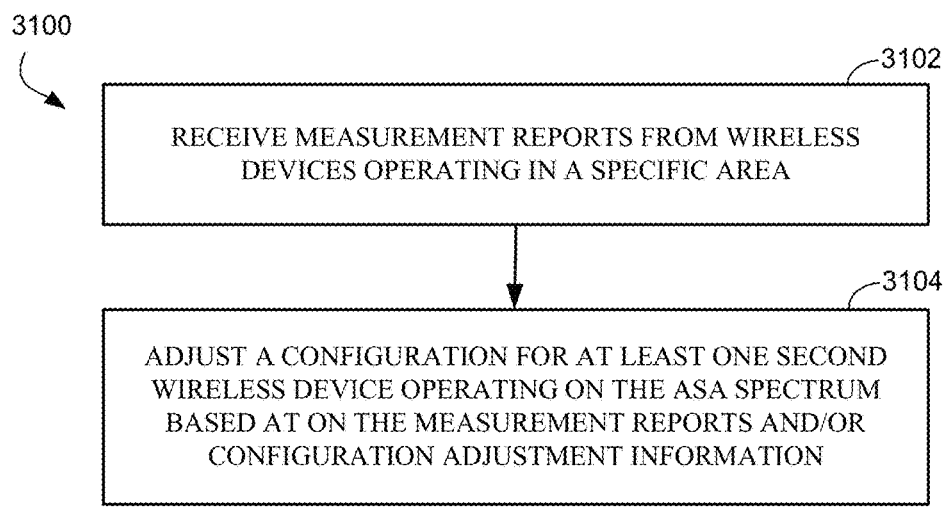
FIG. 31 is a block diagram illustrating a method for verifying authorized shared access operation according to an aspect of the present disclosure.

FIG. 31 is a block diagram illustrating a method 3100 for verifying authorized shared access operation according to an aspect of the present disclosure. An authorized shared access system, such as an authorized shared access controller, may receive measurement reports from wireless devices operating in a specific area, as shown in block 3102. In one configuration, the wireless devices may operate on a spectrum that is different from an authorized shared access spectrum. The authorized shared access system may adjust a configuration for one or more second wireless devices operating on the ASA spectrum based on the received measurement reports and/or configuration adjustment information, as shown in block 3104.

Figure 32:
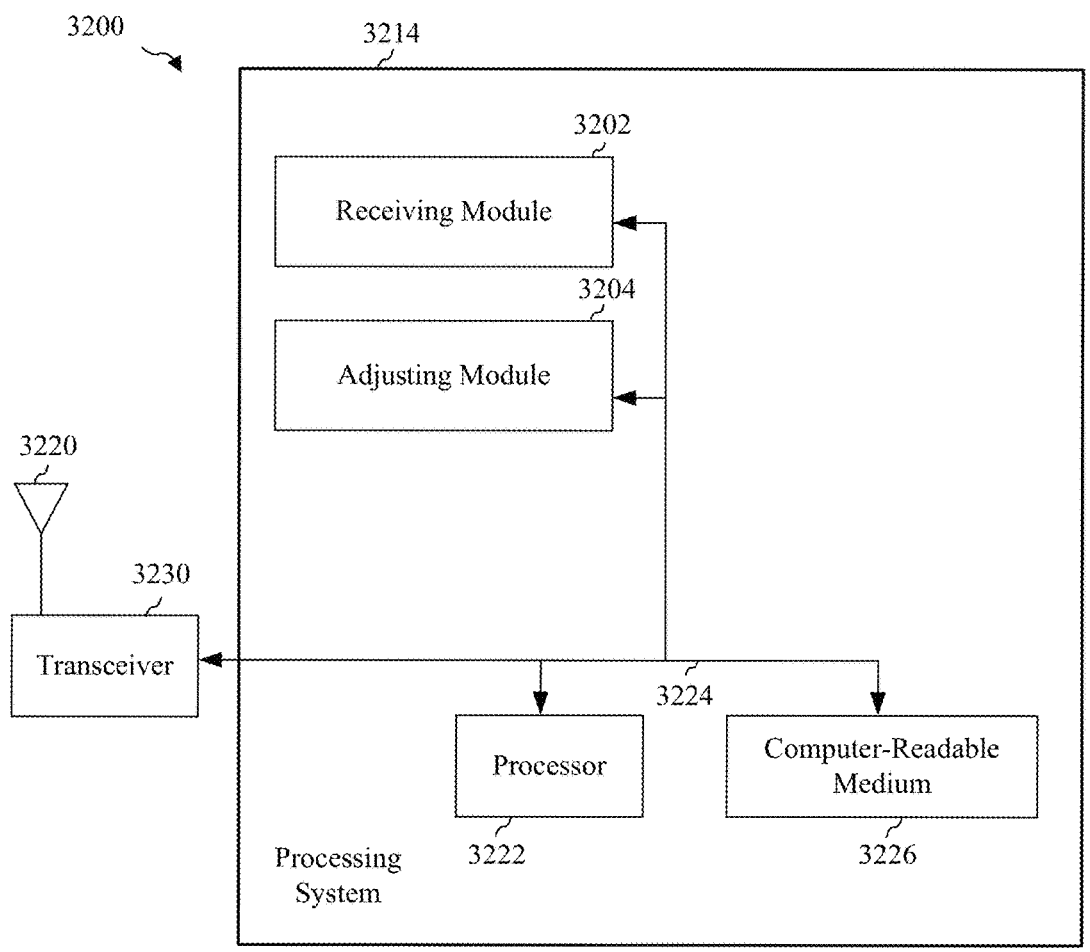
FIG. 32 is a diagram illustrating an example of a hardware implementation for an apparatus employing a processing system according to one aspect of the present disclosure.

FIG. 32 is a diagram illustrating an example of a hardware implementation for an apparatus 3200 employing an authorized shared access processing system 3214 according to one aspect of the present disclosure. The authorized shared access processing system 3214 may be implemented with a bus architecture, represented generally by the bus 3224. The bus 3224 may include any number of interconnecting buses and bridges depending on the specific application of the authorized shared access processing system 3214 and the overall design constraints. The bus 3224 links together various circuits including one or more processors and/or hardware modules, represented by the processor 3222 the modules 3202, 3204, and the computer-readable medium 3226. The bus 3224 may also link various other circuits such as timing sources, peripherals, voltage regulators, and power management circuits, which are well known in the art, and therefore, will not be described any further.

The apparatus includes an authorized shared access processing system 3214 coupled to a transceiver 3230. The transceiver 3230 is coupled to one or more antennas 3220. The transceiver 3230 enables communicating with various other apparatus over a transmission medium. The ASA processing system 3214 includes a processor 3222 coupled to a computer-readable medium 3226. The processor 3222 is responsible for general processing, including the execution of software stored on the computer-readable medium 3226. The software, when executed by the processor 3222, causes the authorized shared access processing system 3214 to perform the various functions described for any particular apparatus. The computer-readable medium 3226 may also be used for storing data that is manipulated by the processor 3222 when executing software.

The authorized shared access processing system 3214 includes a receiving module 3202 for receiving measurement reports from wireless devices operating in a specific area. As previously discussed, the wireless devices operate on a spectrum that is different from an authorized shared access spectrum. The authorized shared access processing system 3214 includes an adjusting module 3204 for adjusting a configuration for one or more second wireless devices operating on the ASA spectrum based on the receive measurement reports and/or configuration adjustment information. The modules may be software modules running in the processor 3222, resident/stored in the computer-readable medium 3226, one or more hardware modules coupled to the processor 3222, or some combination thereof.

In one configuration, an apparatus such as an authorized shared access system is configured for wireless communication including means for receiving. In one aspect, the above means may be the authorized shared access controller 302/402/502/804/1702-2402, authorized shared access network manager 1704-2404, the receiving module 3202, transceiver 3230, antenna 3220, and/or the authorized shared access processing system 3214 configured to perform the functions recited by the aforementioned means. In another aspect, the aforementioned means may be a module or any apparatus configured to perform the functions recited by the aforementioned means.

In one configuration, an apparatus such as an authorized shared access system is configured for wireless communication including means for adjusting. In one aspect, the above means may be the authorized shared access controller 302/402/502/804/1702-2402, authorized shared access network manager 1704-2404, the adjusting module 3204 and/or the authorized shared access processing system 3214 configured to perform the functions recited by the aforementioned means. In another aspect, the aforementioned means may be a module or any apparatus configured to perform the functions recited by the aforementioned means.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). In some implementations, processors may be processors, such as communication processors, specifically designed for implementing functionality in communication devices or other mobile or portable devices.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. As described herein, the use of the term "and/or" is intended to represent an "inclusive OR", and the use of the term "or" is intended to represent an "exclusive OR". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of wireless communication, comprising:
   receiving, at a user equipment (UE) operating on an authorized shared access (ASA) spectrum, an inter-frequency measurement report from a wireless device operating in a specific area and operating on a spectrum that is different from the ASA spectrum;
   receiving, at the UE from a network controller, a transmission adjustment request based at least in part on the measurement report; and
   adjusting, at the UE, a transmission based on at least one of the transmission adjustment request, the measurement report, or a combination thereof.

2. The method of claim 1, further comprising determining whether transmissions of the UE will interfere with transmissions of a primary UE operating on the ASA spectrum based at least in part on the measurement report.

3. The method of claim 1, in which adjusting the transmission comprises adjusting at least one of a transmission power, a transmission frequency, or a combination thereof.

4. The method of claim 3, in which adjusting the transmission power comprises reducing the transmission power, increasing the transmission power, or halting transmissions.

5. The method of claim 1, further comprising adjusting the transmission prior to a primary UE using the ASA spectrum.

6. An apparatus for wireless communication, comprising:
   means for receiving, at a user equipment (UE) operating on an authorized shared access (ASA) spectrum, an inter-frequency measurement report from a wireless device operating in a specific area and operating on a spectrum that is different from the ASA spectrum;
   means for receiving, at the UE from a network controller, a transmission adjustment request based at least in part on the measurement report; and
   means for adjusting, at the UE, a transmission based on at least one of the transmission adjustment request, the measurement report, or a combination thereof.

7. The apparatus of claim 6, further comprising means for determining whether transmissions of the UE will interfere with transmissions of a primary UE operating on the ASA spectrum based at least in part on the measurement report.

8. The apparatus of claim 6, in which the means for adjusting the transmission comprises means for adjusting at least one of a transmission power, a transmission frequency, or a combination thereof.

9. The apparatus of claim 8, in which the means for adjusting the transmission power comprises means for reducing the transmission power, means for increasing the transmission power, or means for halting transmissions.

10. The apparatus of claim 6, in which the means for adjusting the transmission adjusts the transmission prior to a primary UE using the ASA spectrum.

11. A user equipment (UE) operating on an authorized shared access (ASA) spectrum and configured for wireless communication, comprising:
    a memory; and
    at least one processor coupled to the memory, the at least one processor configured:
       to receive an inter-frequency measurement report from a wireless device operating in a specific area and operating on a spectrum that is different from the ASA spectrum;
       to receive, from a network controller, a transmission adjustment request based at least in part on the measurement report; and
       to adjust a transmission based on at least one of the transmission adjustment request, the measurement report, or a combination thereof.

12. The UE of claim 11, in which the at least one processor is further configured to determine whether transmissions of the UE will interfere with transmissions of a primary UE operating on the ASA spectrum based at least in part on the measurement report.

13. The UE of claim 11, in which the at least one processor is further configured to adjust the transmission by adjusting at least one of a transmission power, a transmission frequency, or a combination thereof.

14. The UE of claim 13, in which the at least one processor is further configured to adjust the transmission power by reducing the transmission power, increasing the transmission power, or halting transmissions.

15. The UE of claim 11, in which the at least one processor is further configured to adjust the transmission prior to a primary UE using the ASA spectrum.

16. A non-transitory computer-readable medium having non-transitory program code recorded thereon for wireless communication, the program code comprising:
    program code to receive, at a user equipment (UE) operating on an authorized shared access (ASA) spectrum, an inter-frequency measurement report from a wireless device operating in a specific area and operating on a spectrum that is different from the ASA spectrum;
    program code to receive, at the UE from a network controller, a transmission adjustment request based at least in part on the measurement report; and
    program code to adjust, at the UE, a transmission based on at least one of the transmission adjustment request, the measurement report, or a combination thereof.

17. The non-transitory computer-readable medium of claim 16, in which the program code further comprises program code to determine whether transmissions of the UE will interfere with transmissions of a primary UE operating on the ASA spectrum based at least in part on the measurement report.

18. The non-transitory computer-readable medium of claim 16, in which the program code further comprises program code to adjust the transmission by adjusting at least one of a transmission power, a transmission frequency, or a combination thereof.

19. The non-transitory computer-readable medium of claim 18, in which the program code further comprises program code to adjust the transmission power by reducing the transmission power, increasing the transmission power, or halting transmissions.

20. The non-transitory computer-readable medium of claim 16, in which the program code further comprises program code to adjust the transmission prior to a primary UE using the ASA spectrum.

\* \* \* \* \*